(12) United States Patent
Jones et al.

(10) Patent No.: US 9,524,592 B2
(45) Date of Patent: Dec. 20, 2016

(54) DRIVING ANALYTICS

(71) Applicant: Honda Motor Co., Ltd., Minato-ku, Tokyo (JP)

(72) Inventors: Tim R. Jones, Corona, CA (US); Rich Shannon, Lake Elsinore, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 664 days.

(21) Appl. No.: 13/908,651

(22) Filed: Jun. 3, 2013

(65) Prior Publication Data

US 2014/0358358 A1 Dec. 4, 2014

(51) Int. Cl.
| | |
|---|---|
| G07C 5/00 | (2006.01) |
| G06F 11/30 | (2006.01) |
| G06Q 30/00 | (2012.01) |
| G07C 5/08 | (2006.01) |
| G05B 23/02 | (2006.01) |

(52) U.S. Cl.
CPC ............. *G07C 5/008* (2013.01); *G07C 5/0808* (2013.01); *G05B 23/0264* (2013.01)

(58) Field of Classification Search
USPC .......................... 701/29.1; 702/182; 705/347
See application file for complete search history.

(56) References Cited

U.S. PATENT DOCUMENTS

| | | | |
|---|---|---|---|
| 4,906,970 A | 3/1990 | Momura | |
| 5,631,831 A | 5/1997 | Bird et al. | |
| 5,802,545 A | 9/1998 | Coverdill | |
| 5,848,365 A | 12/1998 | Coverdill | |
| 5,890,080 A | 3/1999 | Coverdill et al. | |
| 5,957,986 A | 9/1999 | Coverdill | |
| 6,622,070 B1 | 9/2003 | Wacker et al. | |
| 6,745,151 B2 | 6/2004 | Marko et al. | |
| 6,985,802 B2 | 1/2006 | Hedges | |
| 7,020,546 B2 | 3/2006 | Nagai et al. | |
| 7,096,101 B2 * | 8/2006 | Sonnenrein ............ | G07C 5/008 701/31.4 |
| 7,349,964 B2 | 3/2008 | Motoyama et al. | |
| 7,376,728 B1 | 5/2008 | Motoyama et al. | |
| 7,650,215 B2 | 1/2010 | Lu et al. | |
| 7,826,944 B2 | 11/2010 | Oesterling et al. | |
| 7,940,673 B2 | 5/2011 | Ballard et al. | |
| 8,024,084 B2 | 9/2011 | Breed | |
| 8,060,400 B2 | 11/2011 | Wellman | |

(Continued)

Primary Examiner — Tyler Paige
(74) Attorney, Agent, or Firm — Arent Fox LLP

(57) ABSTRACT

Embodiments of techniques or systems for customization of, diagnostic assistance, and driving analytics related to snapshot data of a vehicle are provided herein. For example, a snapshot can be taken. The snapshot can be based on a snapshot package customized according to symptoms experienced by a driver of a vehicle, and analyzed individually or in conjunction with other snapshots to determine a trend. Additionally, the snapshot can be based on a configuration of a vehicle. In this scenario, the snapshot and the configuration of the vehicle can be used to provide an enhanced troubleshooting guide by removing non-suspect areas from consideration, thereby mitigating troubleshooting time. The snapshot can be setup to record parameters related to wear and tear on components of the vehicle. Suggestions can be made to a driver of the vehicle to reduce or mitigate actions that negatively impact wear and tear.

18 Claims, 17 Drawing Sheets

(56) References Cited

U.S. PATENT DOCUMENTS

| | | | |
|---|---|---|---|
| 8,239,251 B2 | 8/2012 | Wellman | |
| 8,239,252 B2 | 8/2012 | Wellman | |
| 8,249,910 B2 | 8/2012 | Wellman et al. | |
| 8,301,333 B2 | 10/2012 | Singh et al. | |
| 8,831,825 B2* | 9/2014 | Shah | B60W 50/00 |
| | | | 701/36 |
| 2003/0216889 A1* | 11/2003 | Marko | G07C 5/0808 |
| | | | 702/182 |
| 2005/0234616 A1 | 10/2005 | Oliver et al. | |
| 2007/0100519 A1 | 5/2007 | Engel | |
| 2008/0201448 A1 | 8/2008 | Motoyama et al. | |
| 2009/0177352 A1 | 7/2009 | Grau et al. | |
| 2009/0204287 A1 | 8/2009 | Blanz et al. | |
| 2010/0042498 A1* | 2/2010 | Schalk | G06Q 30/0254 |
| | | | 705/14.52 |
| 2010/0211249 A1 | 8/2010 | McClellan | |
| 2010/0274441 A1 | 10/2010 | Carresjo | |
| 2010/0274607 A1 | 10/2010 | Carresjo et al. | |
| 2010/0325049 A1 | 12/2010 | Tanaka | |
| 2011/0004446 A1* | 1/2011 | Dorn | G01D 4/002 |
| | | | 702/188 |
| 2011/0060496 A1 | 3/2011 | Nielsen et al. | |
| 2011/0176428 A1 | 7/2011 | Ballard et al. | |
| 2011/0202228 A1 | 8/2011 | Brusarosco et al. | |
| 2011/0238258 A1* | 9/2011 | Singh | G07C 5/0808 |
| | | | 701/31.4 |
| 2012/0035803 A1 | 2/2012 | Singh et al. | |
| 2012/0053778 A1 | 3/2012 | Colvin et al. | |
| 2012/0089299 A1 | 4/2012 | Breed | |
| 2012/0136802 A1* | 5/2012 | McQuade | G06Q 30/0282 |
| | | | 705/347 |
| 2012/0232961 A1 | 9/2012 | Wellman et al. | |
| 2014/0358357 A1* | 12/2014 | Jones | G07C 5/0816 |
| | | | 701/31.4 |
| 2014/0358358 A1* | 12/2014 | Jones | G07C 5/008 |
| | | | 701/31.4 |

* cited by examiner

DRIVING ANALYTICS

This application is related to pending U.S. patent application, Ser. No. 13/908,600, entitled 'EVENT DRIVEN SNAPSHOTS', filed on Jun. 3, 2013 and pending U.S. patent application, Ser. No. 13/908,604, entitled 'DIAGNOSTIC ASSISTANCE', filed on Jun. 3, 2013. The entireties of the above-noted application(s) are incorporated by reference herein.

BACKGROUND

Generally, a vehicle includes a variety of systems, where a system can include one or more units or one or more sensors. For example, a vehicle can have an engine system, a fuel system, a transmission system, an electrical system, an antilock braking system (ABS), a vehicle stability assist (VSA) system, a telematics system, etc. Components of a vehicle, such as a system, unit, sensor, etc., can be connected via one or more connections or one or more networks. When a problem with a vehicle occurs, information related to one or more of the components can be helpful to determine a solution to the problem or a root cause of the problem, for example. However, as technology advances, and systems or vehicles become more complex, troubleshooting can be difficult or time consuming.

SUMMARY

This summary is provided to introduce a selection of concepts in a simplified form that are described below in the detailed description. This summary is not intended to be an extensive overview of the claimed subject matter, identify key factors or essential features of the claimed subject matter, nor is it intended to be used to limit the scope of the claimed subject matter.

One or more embodiments of techniques or systems for customization of snapshots, diagnostic assistance, and driving analytics for one or more vehicles are provided herein. Generally, a vehicle can include one or more systems, which can include one or more units or one or more sensors. Additionally, components of a vehicle, such as a system, unit, or sensor, can be connected by one or more connections or one or more controller area networks (CANs). Information or data pertaining to or associated with components, systems, units, sensors, CANs, etc. can be collected by taking a snapshot of one or more corresponding parameters. These snapshots can enhance troubleshooting, diagnostic assistance, root cause analysis, or a driving experience of a driver of a vehicle.

According to one or more embodiments, a snapshot can customized for a driver of a vehicle in a per occurrence manner. For example, when a driver of a vehicle notifies a third party, such as a dealer, that they are experiencing a problem, the third party can arrange for a snapshot to be taken the next time the problem or a similar problem occurs. In other words, the third party can configure the vehicle to take a snapshot based on user input. As an example, a dealer can tell a driver to press and hold the power button on the stereo of the vehicle for three seconds when the vehicle bucks. Upon receiving the user input, such as the pushing and holding of the power button, the vehicle could record snapshot data related to one or more potential trouble areas or components. Further, the snapshot data can be sent to a server, along with other snapshots from other vehicles for analysis. In this way, regional issues can be quickly identified. For example, if a gas station is dispensing gasoline tainted with impurities, a compilation of snapshot data from vehicles in the area could be used to determine such a problem, because fuel tanks on problem vehicles are detected to be full.

According to one or more embodiments, troubleshooting tips or diagnostic assistance can be provided for efficient troubleshooting. Because a vehicle generally has a fixed, known, or pre-programmed configuration (e.g., based on a model, make, year, serial number, etc. of the vehicle), a snapshot can be directed towards a set of data that enables one or more areas or components of the vehicle to be classified as suspect, non-suspect, or unknown. As an example, a circuit of an electrical system of the vehicle is generally known and consistent across a model of a particular vehicle. When a problem occurs, such as a diagnostic trouble code (DTC), the vehicle can be configured to indicate one or more potential problem areas. A snapshot can be taken based on the DTC and the configuration of the circuit. This snapshot can be used to analyze one or more of the potential problem areas and classify the potential problem areas as suspect or non-suspect. Non-suspect areas can be removed from troubleshooting or ranked lower than suspect areas. Accordingly, a technician could inspect one or more of the suspect areas before inspecting one or more of the non-suspect areas, thereby improving or enhancing diagnostic assistance by mitigating troubleshooting time.

According to one or more embodiments, a snapshot can be setup to record parameters related to wear and tear on components of the vehicle. The snapshot can be used to generate a report for a driver with a summary of driving habits of the driver. Additionally, suggestions can be made to a driver of the vehicle to reduce or mitigate actions that negatively impact wear and tear. For example, if a driver tends to take hard turns, a report could be generated to suggest that the driver take turns at a lower speed. In one or more embodiments, suggestions can be made to the driver in real time, such as during or shortly after the turn. In other embodiments, suggestions can be made to a driver before the driver approaches an anticipated fast turn. For example, a voice prompt could suggest the driver slow down to 10 miles per hour (mph) in advance.

The following description and annexed drawings set forth certain illustrative aspects and implementations. These are indicative of but a few of the various ways in which one or more aspects are employed. Other aspects, advantages, or novel features of the disclosure will become apparent from the following detailed description when considered in conjunction with the annexed drawings.

DESCRIPTION OF THE DRAWINGS

Aspects of the disclosure are understood from the following detailed description when read with the accompanying drawings. Elements, structures, etc. of the drawings may not necessarily be drawn to scale. Accordingly, the dimensions of the same can be arbitrarily increased or reduced for clarity of discussion, for example.

DETAILED DESCRIPTION

Figure 1:
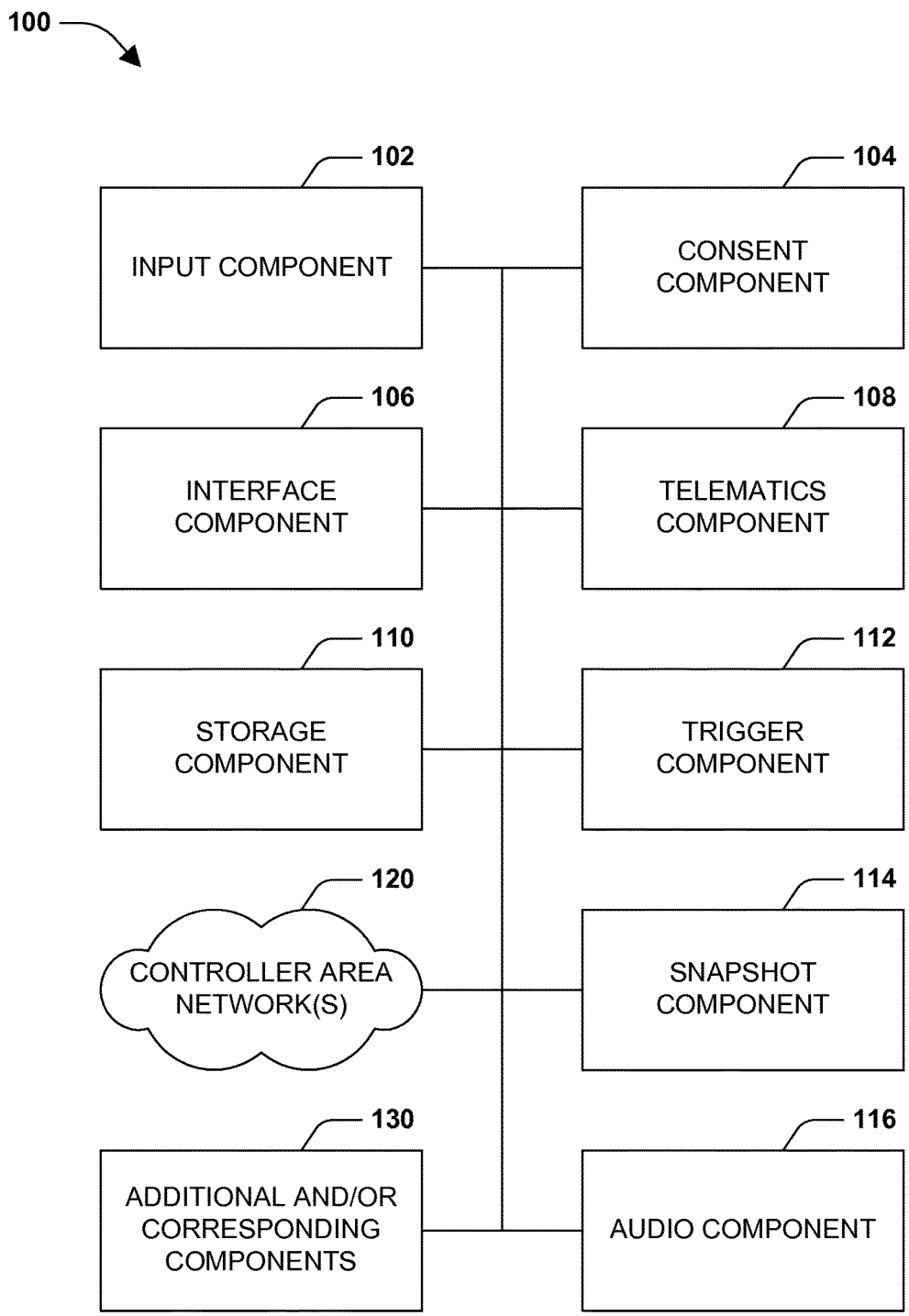
FIG. 1 is an illustration of an example system for customizing vehicle snapshot data, according to one or more embodiments.

Embodiments or examples, illustrated in the drawings are disclosed below using specific language. It will nevertheless be understood that the embodiments or examples are not intended to be limiting. Any alterations and modifications in the disclosed embodiments, and any further applications of the principles disclosed in this document are contemplated as would normally occur to one of ordinary skill in the pertinent art.

Figure 17:
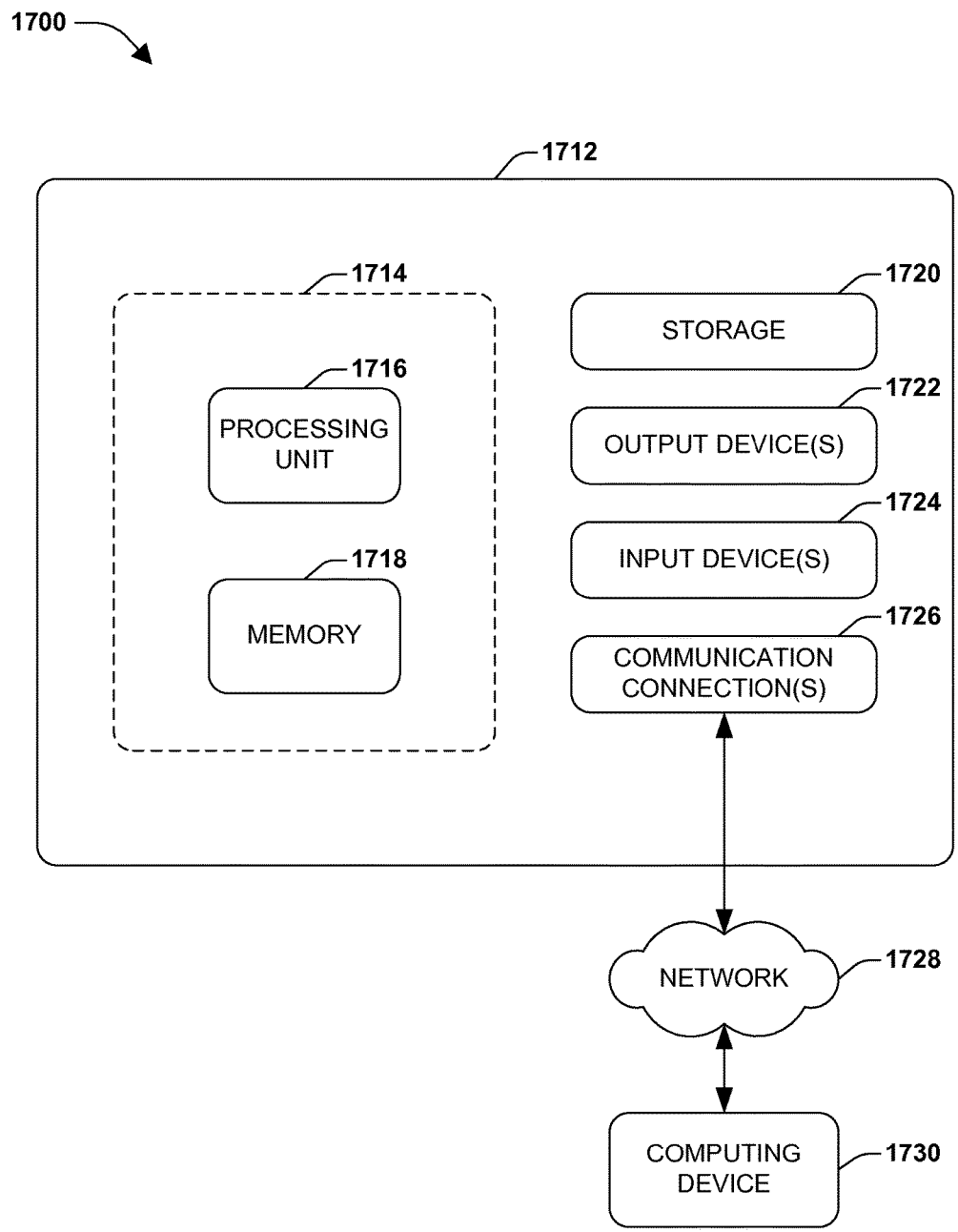
FIG. 17 is an illustration of an example computing environment where one or more of the provisions set forth herein are implemented, according to one or more embodiments.

For one or more of the figures herein, one or more boundaries, such as boundary 1714 of FIG. 17, for example, are drawn with different heights, widths, perimeters, aspect ratios, shapes, etc. relative to one another merely for illustrative purposes, and are not necessarily drawn to scale. For example, because dashed or dotted lines are used to represent different boundaries, if the dashed and dotted lines were drawn on top of one another they would not be distinguishable in the figures, and thus are drawn with different dimensions or slightly apart from one another, in one or more of the figures, so that they are distinguishable from one another. As another example, where a boundary is associated with an irregular shape, the boundary, such as a box drawn with a dashed line, dotted lined, etc., does not necessarily encompass an entire component in one or more instances. Conversely, a drawn box does not necessarily encompass merely an associated component, in one or more instances, but encompasses at least a portion of one or more other components as well.

As used herein, a component can include one or more systems, one or more units, one or more controller area networks (CANs), one or more sensors, one or more connections, one or more additional components, or other components.

FIG. 1 is an illustration of an example system 100 for customizing vehicle snapshot data, according to one or more embodiments. In one or more embodiments, a vehicle can be equipped with a system 100 for customizing vehicle snapshot data. The system 100 can include an input component 102, an interface component 106, a storage component 110, one or more controller area networks (CANs) 120, a consent component 104, a telematics component 108, a trigger component 112, a snapshot component 114, one or more additional components 130 or one or more corresponding components. In one or more embodiments, the snapshot component 114 can be an engine control unit (ECU), a powertrain control module (PCM), a control unit, control module, etc.

As an example, snapshot data for a vehicle can be customized when a driver or an occupant of the vehicle notices a symptom, such as a hard buck. The driver can notify a third party of the symptom by initiating a request. The request can be initiated via the input component 102. In one or more embodiments, the input component 102 can include buttons on a steering wheel, dashboard, radio, etc. of the vehicle. For example, a driver or an occupant of a vehicle can issue a request via a voice command. As another example, the driver or the occupant can press a button on a dash of the vehicle, such as a power button for a radio. In other words, the input component 102 can be configured to receive a request from a driver or an occupant of a vehicle.

A request can include or be based on one or more symptoms experienced by the driver or the occupant. The request can be passed along to a telematics component 108, and sent to a third party. For example, a driver could initiate a request via a voice command by speaking, "I'm having problems with my vehicle". An audio component 116 or an input component 102 could route the request to a telematics component 108 over one or more CANs 120, which can initiate or transmit a phone call, an email, a text, an alert, etc. to a third party. The audio component 116 can include a microphone or one or more speakers. In other embodiments, the request can be initiated through the input component 102 by the push of a button or a sequence of buttons. The interface component 106 can include a display and be configured to confirm the request for the driver or that the request has been sent to the third party.

In one or more embodiments, such as when a phone call is initiated with a third party based on a request from a driver of a vehicle, the driver or occupant of the vehicle can verbally communicate one or more symptoms they are experiencing to the third party. For example, the driver can be connected with an operator, and given an opportunity to discuss problems that he or she can be experiencing. A driver can provide details pertaining to one or more symptoms, such as gears grinding when shifting, noises, uneven acceleration, a buck, etc. In response, a snapshot package can be generated and sent to the vehicle. According to one or more aspects, a consent component 104 can prompt the driver for consent to have the vehicle receive the snapshot package or to participate in a data collection program utilizing snapshots, for example. In one or more embodiments, the interface component 106 can be configured to display the prompt for consent. In other embodiments, the audio component 116 can be configured to provide an audio prompt for consent to participate by receiving or downloading a snapshot package or taking snapshots. The driver can opt in or opt out using the input component 102, such as by pushing a button, or the audio component 116, such as by giving verbal authorization. The interface component 106 or the audio component 116 can be configured to provide visual or audio confirmation of a selection, for example.

Generally, a vehicle can have one or more components, systems, units, sensors, or controller area networks (CANs), etc. A CAN may be configured to share information or enable connectivity between components of a vehicle. These components often have one or more corresponding parameters. For example, an engine system can be associated with one or more engine conditions, such as coolant temperature, engine speed, throttle position, engine load, air flow rate, fuel pressure, etc. However, because a symptom or a problem can be unique, a snapshot of a standard set of parameters may not be useful or detailed enough for troubleshooting.

A snapshot package enables customization of one or more of these parameters. For example, an interval at which a parameter is measured can be increased or decreased, thereby enhancing a level of granularity associated with a parameter. As another example, the snapshot package can enable one or more parameters to be measured or recorded at a customized time. The snapshot package can enable a vehicle to record one or more of the parameters when an event or a trigger occurs. Further, the snapshot package can include a set of customized parameters to measure or record, thereby mitigating storage space for parameters that may not be of interest. In this way, a snapshot can be customized by setting a snapshot package up accordingly.

A telematics component 108 or a storage component 110 can be configured to receive or store a snapshot package. For example, the snapshot package can be transmitted to the vehicle via a telematics channel. Additionally, the interface component 106 or the audio component 116 can be configured to confirm when a snapshot package is received or stored to a vehicle. The audio component 116 can play a tone when the snapshot package is downloaded via the telematics component 108. The interface component 106 can flash a light or display text confirming receipt of the snapshot package. If a vehicle is not equipped with telematics, a driver can take the vehicle to a dealer to receive the snapshot package. The dealer can connect an external device to the vehicle, a CAN 120 of the vehicle, or the interface component 106 to transmit the snapshot package to the vehicle. In this way, the vehicle can be configured to receive or store the snapshot package.

A snapshot package can include a trigger, a snapshot window, a set of one or more parameters and one or more corresponding components (e.g., associated with one or more of the parameters or from which the parameters can be recorded). The trigger can be a condition, that when met, triggers a recording of one or more of the parameters from one or more of the corresponding components. The snapshot window can be a duration or a window, such as before the trigger, during the trigger, or after the trigger, during which one or more of the parameters are to be recorded. In one or more embodiments, data from one or more parameters of the vehicle can be measured in a continuous, discrete, manner.

In this example, when an occurrence of a trigger is received, data associated with these measurements can be recorded. In this way, data associated with one or more of the parameters can be recorded for an event when an event of interest occurs before a trigger, such as, for example, when a driver experiences a problem or a symptom with a vehicle.

Additionally, a snapshot package can include different snapshot windows for one or more of the parameters. A snapshot package can include parameters A, B, and C, where A and B have a same snapshot window, while parameter C has a different snapshot window. As an example, a snapshot package can include engine speed and engine temperature. In some scenarios, it can be desirable to record or examine a greater range or window of engine temperature data than engine speed data. Here, the snapshot package can be customized such that the engine temperature parameter is recorded for a longer period of time than the engine speed parameter. Additionally, the snapshot package can include a recording interval or recording frequency for one or more of the parameters. For example, a recording interval or recording frequency can specify how often a measurement is taken from a corresponding component.

In one or more embodiments, a snapshot package can be pre-programmed into a vehicle. For example, commonly recorded parameters can be packaged together in a pre-programmed snapshot package that can be available for use without a request. Pre-programmed snapshot packages may be included based on historical data from drivers, or based on a model of a vehicle, for example.

Upon alerting a third party about the symptom, a snapshot package can be generated by a third party, such by an operator or a server, and sent to the vehicle. The snapshot package can be received by the vehicle. Since components of the vehicle are continuously taking measurements, the driver can manually trigger a snapshot after the symptom occurs and capture a recording of parameters associated with a problem or a symptom during a time period prior to the manual trigger. In one or more embodiments, customer service can send or transmit a snapshot package to a vehicle and tell a driver to manually trigger a snapshot the next time a symptom occurs. For example, customer service can tell the driver to hold down the power button to the stereo for three seconds when the vehicle lurches. In response to the manual trigger of pressing and holding the button, a snapshot can be recorded from a set of rolling or continuously measured parameters such that the snapshot includes data prior to the manual trigger.

In one or more embodiments, one or more additional components 130 or one or more corresponding components can include chassis components, engine components, fuel components, transmission components, electrical components, power components, charging components, audio components, antilock braking system (ABS) components, all-wheel drive (AWD) components, vehicle stability assist (VSA) components, one or more sensors, temperature components, etc. These additional components can include different combinations of systems, units, sensors, sub-components, etc. and be associated with one or more parameters. In one or more embodiments, one or more of these parameters can be measured on a rolling basis or stored to the storage component 110. A snapshot is generally a recording or a measurement of one or more of the parameters designated by the snapshot package, taken during a duration corresponding to the snapshot window of the snapshot package. The snapshot can be initiated by an event or trigger provided by the snapshot package. When the snapshot is triggered, parameters not designated by the snapshot package can be discarded or archived, for example. In other words, a subset of the parameters measured on a rolling basis can be collected or stored based on the snapshot package.

When a snapshot package is received, a trigger component 112 can poll one or more CANs 120 for an occurrence of a trigger. For example, if a trigger of a received snapshot package is a voice command, the audio component 116 can receive the voice command and pass the voice command to a CAN 120, where the voice command can be identified as an occurrence of a trigger. As another example, if a driver is experiencing bucking from the vehicle, a snapshot package can have a trigger setup to record a snapshot when a longitudinal G-sensor has a delta × greater than or exceeding a threshold. When such a buck occurs, a CAN 120 connected to a system including the longitudinal G-sensor can be notified of the buck, thereby triggering a snapshot of one or more parameters of interest. In this way, the trigger component 112 can be configured to monitor the vehicle or one or more CANs 120 of the vehicle for one or more triggers.

A trigger can be triggered manually or automatically. For example, if a driver of a vehicle indicates that his or her vehicle doesn't start quickly, a snapshot package can include a trigger to automatically record one or more parameters if the vehicle isn't started within two seconds of ignition, where one or more of the parameters relate to ignition of the vehicle. Here, the trigger can be based on one or more conditions associated with one or more of the corresponding components. A trigger can be based on a statistic related to a component of a vehicle. For example, if 98% of vehicles start within two seconds of ignition, a snapshot package or a trigger of a snapshot package can be set to record data when a vehicle takes longer than two seconds to start. As another example, if a driver is experiencing an intermittent problem, the snapshot package can be configured to record or store parameters based on a manual trigger, such as a voice command via the audio component 116 or a push of a button via the input component 102. The manual trigger can include pushing a sequence of buttons or pressing a holding one or more buttons of the input component 102, for example. In other words, the trigger can be based on one or more user inputs.

When an occurrence of a trigger is detected by the trigger component 112, the snapshot component 114 can record a snapshot according to the snapshot package. For example, a snapshot window can dictate that data or parameters are to be recorded fifteen seconds before a trigger through five seconds after the trigger. This enables the snapshot to capture a more complete view of a situation or symptoms associated with a problem, for example. In other words, when a trigger is sent over a CAN, one or more systems, units, components, sensors, etc. within the vehicle can be configured to issue a record data command in response to the trigger. This record data command can instruct the storage component 110 to pluck parameter information or data from the CAN and populate a snapshot accordingly within a snapshot window. The snapshot component 114 can be configured to record one or more parameters designated by the snapshot package within a snapshot window or time frame, in response to an occurrence of a trigger. In other words, the snapshot component 114 can be configured to take a snapshot based on a snapshot package and an occurrence of a trigger by recording a set of one or more parameters from one or more corresponding components, as indicated by the snapshot package. The snapshot package or snapshot component 114 can be configured to capture one or more of the parameters from one or more CANs 120. The snapshot can be taken from a set of parameters that are measured on a rolling basis, thereby enabling a snapshot to record or capture data prior to an occurrence of a trigger. In one or more embodiments, the snapshot component 114 enables a snapshot of one or more parameters to be taken without an external diagnostic tool, because the system 100 can transmit the snapshot to a server or a third party via the telematics component 108.

Additionally, notification can be provided that a snapshot has been recorded. For example, the audio component 116 can be configured to play a tone when a snapshot is recorded or the interface component 106 can flash a light, a light emitting diode (LED), or display a confirmation text, etc. In one or more embodiments, the telematics component 108 can be configured to send one or more parties an alert that the snapshot has been recorded or is available. For example, the driver can be sent a text message, email, or other alert that the snapshot is recorded. Additionally, the dealership or a third party can also be alerted that the snapshot has been recorded.

The snapshot component 114 can store the snapshot in the storage component 110 by communicating the snapshot from the snapshot component 114 over one or more of the CANs 120 to the storage component 110. In one or more embodiments, the telematics component 108 can be configured to transmit the snapshot to a third party, such as a server, for example. In other words, the snapshot can be transmitted based on a telematics channel. Additionally, the telematics component 108 can be configured to notify a third party when the snapshot is available, such as after a driver initiates a manual trigger. If a vehicle is not equipped with a telematics component 108, a driver can bring a vehicle into a dealer, where an external device can be connected to the vehicle to retrieve the snapshot. An analysis of the snapshot can be performed, and one or more suggestions or solutions can be proposed based on the snapshot. In one or more embodiments, the telematics component 108 can be configured to receive one or more of the suggestions or one or more of the solutions from the third party or a server. Accordingly, when the driver takes the vehicle into a dealer, the dealer can be presented with troubleshooting suggestions or solutions for a problem. For example, data from the snapshot can indicate that one or more components, systems, units, or areas of the vehicle are suspect, and point a technician towards those areas.

Figure 2:
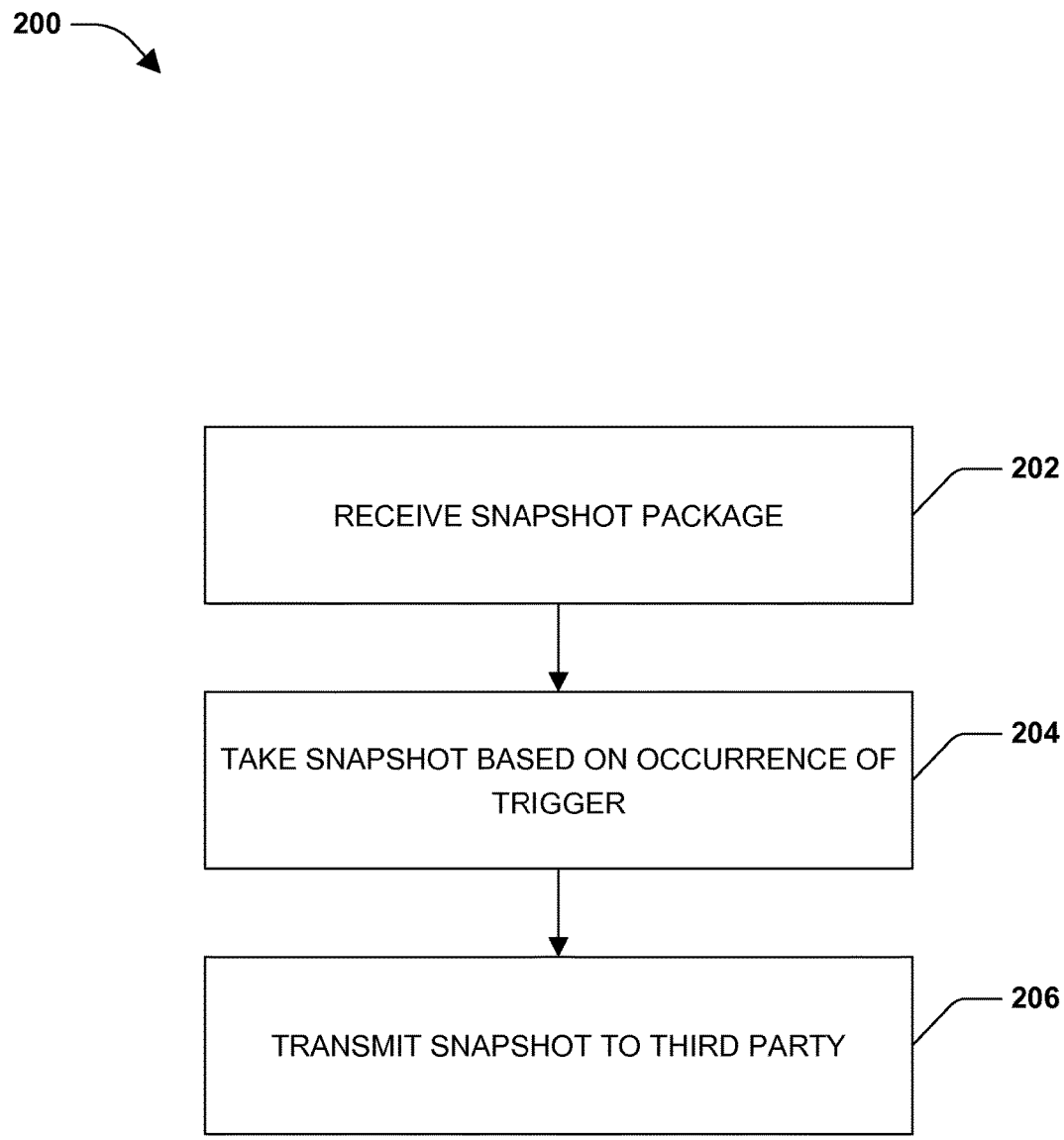
FIG. 2 is an illustration of an example flow diagram of a method for customizing vehicle snapshot data, according to one or more embodiments.

FIG. 2 is an illustration of an example flow diagram of a method 200 for customizing vehicle snapshot data, according to one or more embodiments. At 202, a snapshot package can be received. For example, the snapshot package can include a trigger, a snapshot window, a set of one or more parameters to be obtained or recorded from one or more corresponding components, a snapshot interval, a snapshot frequency, etc. The snapshot package can be based on one or more symptoms associated with a vehicle or symptoms reported by a driver of the vehicle, for example. In one or more embodiments, the snapshot package can be configured off board of the vehicle, such as at a third party server, for example. At 204, a snapshot can be taken or captured based on an occurrence of a trigger of the snapshot package. When the snapshot is taken or captured, one or more of the parameters included in the snapshot package can be recorded from rolling measurements taken from one or more of the corresponding components. The snapshot can include data prior to the trigger, because the parameters are recorded in a rolling manner. At 206, the snapshot can be transmitted to a third party, such as via a telematics channel.

Figure 3:
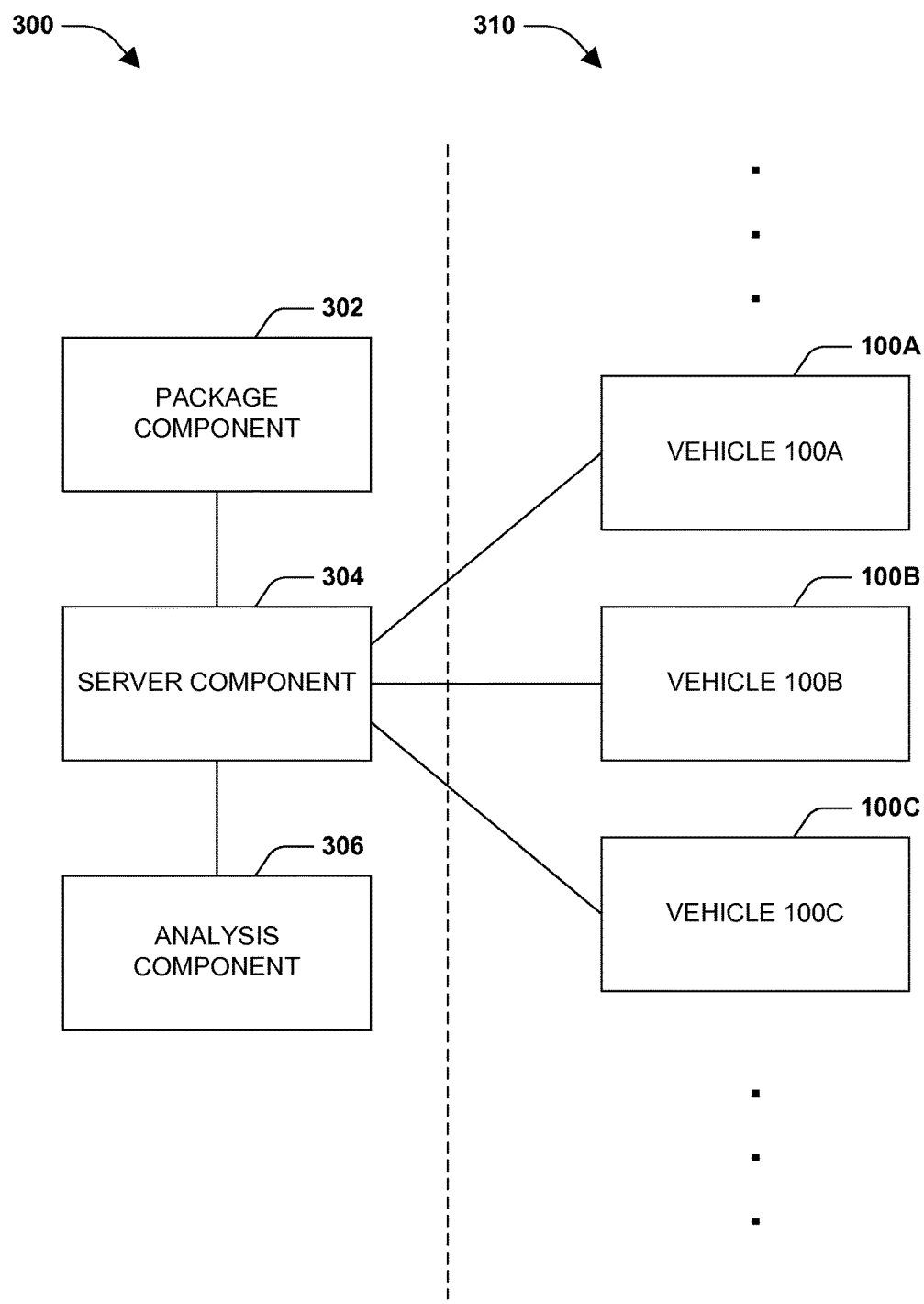
FIG. 3 is an illustration of an example system for customizing vehicle snapshot data, according to one or more embodiments.

FIG. 3 is an illustration of an example system 300 for customizing vehicle snapshot data, according to one or more embodiments. The system 300 can include a package component 302, a server component 304, and an analysis component 306. The system 300 can be configured to customize snapshot data by generating a snapshot package customized for a vehicle based on symptoms or problems the vehicle is experiencing.

For example, when a driver of a vehicle, such as Vehicle 100A, experiences a problem or a symptom, a driver or an occupant of the vehicle can initiate, send, or transmit a request for assistance to the server component 304. The request can be initiated by a driver or an occupant of the vehicle by holding a button down, for example. One or more vehicles 310, such as Vehicles 100A, 1008, and 100C, can be communicatively coupled with the server component 304 via a telematics channel or a telematics component on the vehicle (not shown). The server component 304 can be configured to receive the request from one or more vehicles. The request can include or be based on one or more of the symptoms associated with the vehicle. In one or more embodiments, the server component 304 is configured to receive one or more symptoms associated with a vehicle. As an example, the driver of a vehicle could be prompted with a list of symptoms, such as noises, smells, vibrations, movements, bucks, etc. In this example, the driver can select one or more appropriate symptoms and transmit the symptoms to the server component 304. In other embodiments, the driver of a vehicle can provide an operator with one or more of the symptoms and the operator can input or provide one or more of the symptoms to the server component 304.

When one or more of the symptoms for a vehicle are received, the server component 304 can pass the symptoms to the package component 302. The package component 302 can be configured to generate a snapshot package for a vehicle based on one or more symptoms associated with the vehicle in response to the request. Additionally, the package component 302 can be configured to generate a snapshot package based on a configuration of the vehicle. Generally, a snapshot package includes a trigger, a snapshot window or a duration of the snapshot, a set of one or more parameters to be recorded from one or more corresponding components of a vehicle, and other parameters related to recording snapshot data, such as a recording interval or recording frequency. The package component 302 can be configured to generate a snapshot by determining one or more triggers, one or more snapshot windows, and one or more parameters to record from one or more corresponding components of a vehicle. In other words, the package component 302 can select which units, systems, components, sensors, etc. of a vehicle will send, store, or record what type of information. Accordingly, a snapshot can be setup to include a variety of parameters pertinent to a particular symptom. Further, a snapshot can be setup to trigger according to a condition relating to one or more parameters. For example, a snapshot package can be setup to trigger a snapshot when a vertical G-sensor exceeds a threshold value. In this way, use of storage can be mitigated, because parameters can be recorded in a custom manner.

The package component 302 can configure a snapshot package to record one or more parameters of one or more corresponding components thought to be related to a root cause of a problem which can be causing one or more of the symptoms. For example, a snapshot package can be configured to capture data or parameters from one or more systems, units, or CANs based on one or more symptoms. Additionally, the package component 302 can set the snapshot window or recording interval accordingly such that an appropriate amount of data can be captured before, during, or after a symptom occurs, and the snapshot is triggered. In one or more embodiments, the snapshot package can be configured off board of a vehicle.

In one or more embodiments, the package component 302 can generate a snapshot package with one or more triggers. For example, a snapshot package can be configured to record a snapshot based on a manual trigger or an automatic trigger. A snapshot can be manually triggered by a driver or an occupant of a vehicle by providing one or more user inputs, such as a voice command, pushing or holding a combination of one or more buttons, etc. This can be done by the driver when a symptom occurs. Additionally, a snapshot can be automatically triggered by a sensor, unit, component, system, etc. of a vehicle. For example, a snapshot can be recorded when a unit detects that the engine coolant temperature is greater than a threshold or a triggering condition.

The package component 302 can pass the snapshot package to the server component 304. In one or more embodiments, the server component 304 can be configured to transmit or send a snapshot package to a vehicle, such as in response to a request for assistance from the vehicle, for example. In one or more embodiments, the server component 304 can be configured to transmit the snapshot package via a telematics channel to a telematics component of the vehicle. If a vehicle is not equipped with telematics, an external device (not shown) can be used to transmit a snapshot to a vehicle. For example, a driver can bring his or her vehicle into a dealership, describe one or more symptoms exhibited by the vehicle, and have a snapshot downloaded to the vehicle via an external device, where the snapshot can be a set of one or more parameters customized to one or more of the symptoms described by the driver.

When a vehicle records a snapshot, the vehicle can be configured to transmit the snapshot to the server component 304. For example, the server component 304 can receive the snapshot and send the snapshot to the analysis component 306 for analysis. The analysis component 306 can be configured to provide one or more troubleshooting tips, one or more suggestions, one or more solutions based on the snapshot and symptoms of the vehicle. In one or more embodiments, the analysis component 306 can be configured to receive a snapshot from the server component 304, where the snapshot include a set of one or more parameters associated with one or more corresponding components of a vehicle.

Further, the analysis component 306 can be configured to determine one or more trends from one or more snapshots gathered from one or more vehicles. For example, if a vehicle, such as Vehicle 100A, reports symptoms that the engine is shuddering, a snapshot package can be generated to investigate parameters related to spark plugs, a distributor cap, an oxygen sensor, fuel tank level, location of the vehicle, etc. on the vehicle. Similarly, Vehicles 100B and 100C can also report engine shuddering, and similar snapshot packages can be generated. If snapshot data gathered from Vehicles 100A, 100B, and 100C indicates that engine misfires are occurring while the fuel tank levels on respective vehicles are relatively full, it can be determined that gasoline tainted with impurities is being distributed by a local gas station, for example. In this way, data from one or more additional snapshots associated with one or more additional vehicles can be analyzed to determine a trend. The trend can be within vehicle or the trend can be across multiple vehicles.

Additionally, the analysis component 306 can determine trends across geographic regions, times of day, days of the year, models of cars, temperatures, vendors, specifications, regional issues, etc. For example, if multiple vehicles are reporting failures of a unit within a model of a car, a trend can be determined indicating a specification issue or a quality issue associated with that unit or from a vendor of the unit.

Figure 4:
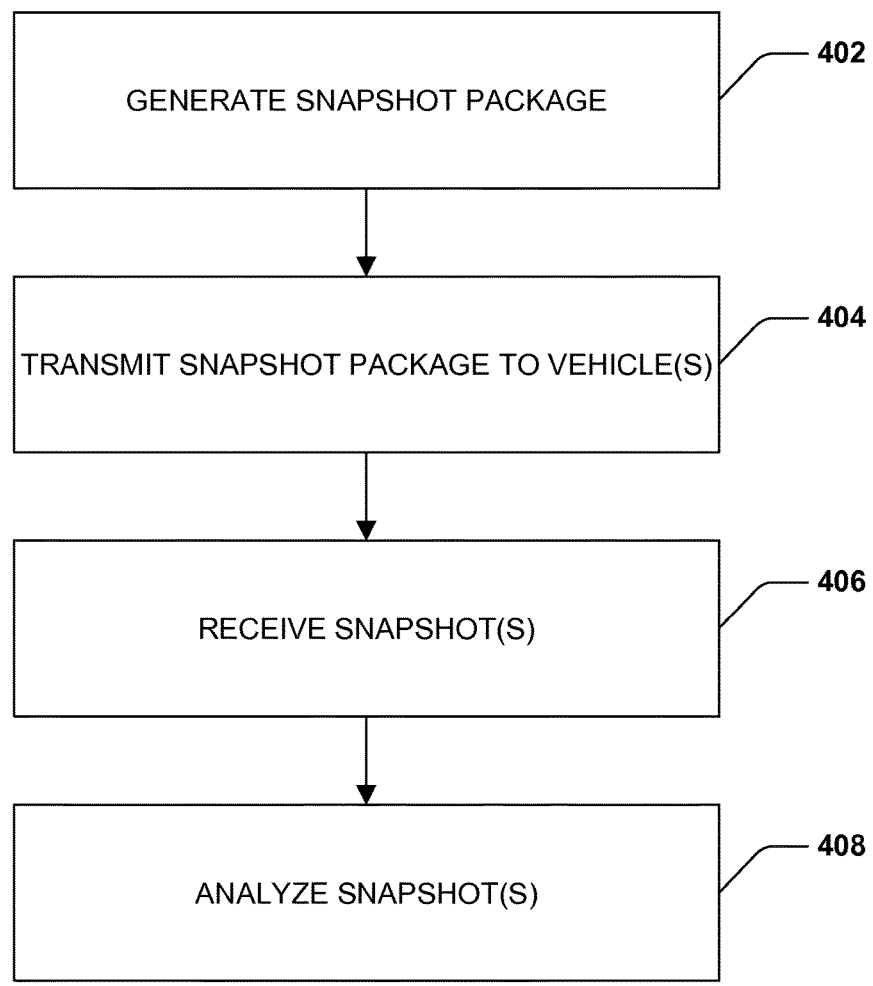
FIG. 4 is an illustration of an example flow diagram of a method for customizing vehicle snapshot data, according to one or more embodiments.

FIG. 4 is an illustration of an example flow diagram of a method 400 for customizing vehicle snapshot data, according to one or more embodiments. At 402, a snapshot package can be generated in response to receiving one or more symptoms associated with a vehicle. At 404, the snapshot package can be transmitted to a vehicle. The different snapshot packages can be generated for different vehicles based on symptoms of a vehicle or a configuration of a vehicle. For example, a first vehicle can be equipped with one or more components that are not on a second vehicle. This means the second vehicle will not have parameters associated with the components that are not equipped. At 406, a snapshot can be received from a vehicle. At 408, one or more snapshots can be analyzed. For example, a snapshot can be analyzed to determine a problem area within a vehicle. Snapshots can also be analyzed to determine regional trends or trends across a variety of factors, such as temperature, model, make, season, time of day, day of year, etc.

Figure 5:
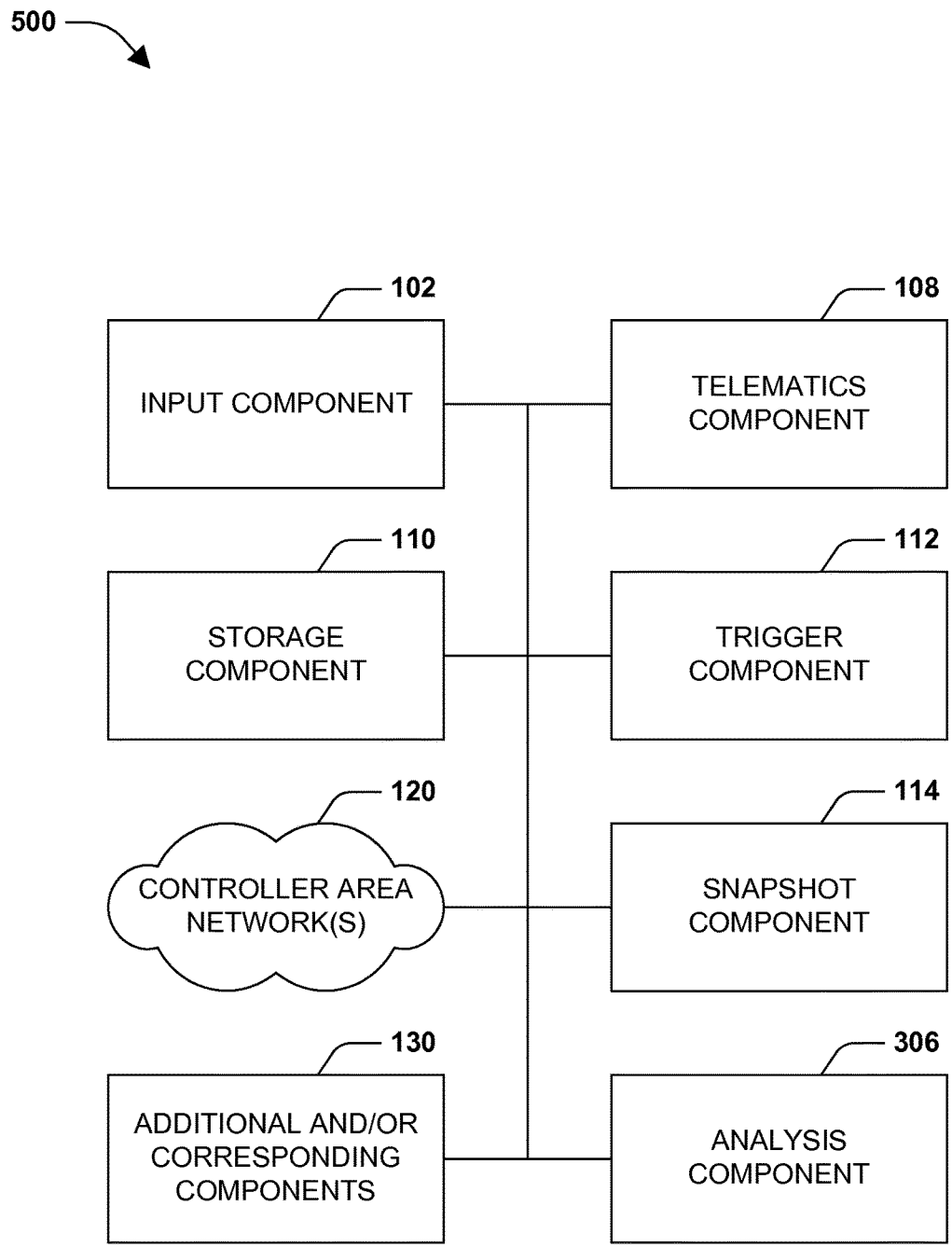
FIG. 5 is an illustration of an example system for customizing vehicle snapshot data, according to one or more embodiments.

FIG. 5 is an illustration of an example system 500 for customizing vehicle snapshot data, according to one or more embodiments. FIG. 5 is similar to FIG. 1, except that the system 500 of FIG. 5 includes an analysis component 306. One or more components, such as the analysis component 306 of FIG. 3, can be implemented on board a vehicle (e.g., as seen in FIG. 5) or off board of a vehicle (e.g., as seen in FIG. 3). In other words, the analysis component 306 of FIG. 5 can be configured in a similar fashion to the analysis component 306 of FIG. 3. When a vehicle takes or records a snapshot, the telematics component 108 can transmit the snapshot off board and have the snapshot analyzed off board. In one or more embodiments, the analysis component 306 of FIG. 5 can analyze the snapshot on board the vehicle to provide a driver with suggestions relating to one or more symptoms experienced by the driver.

Figure 6:
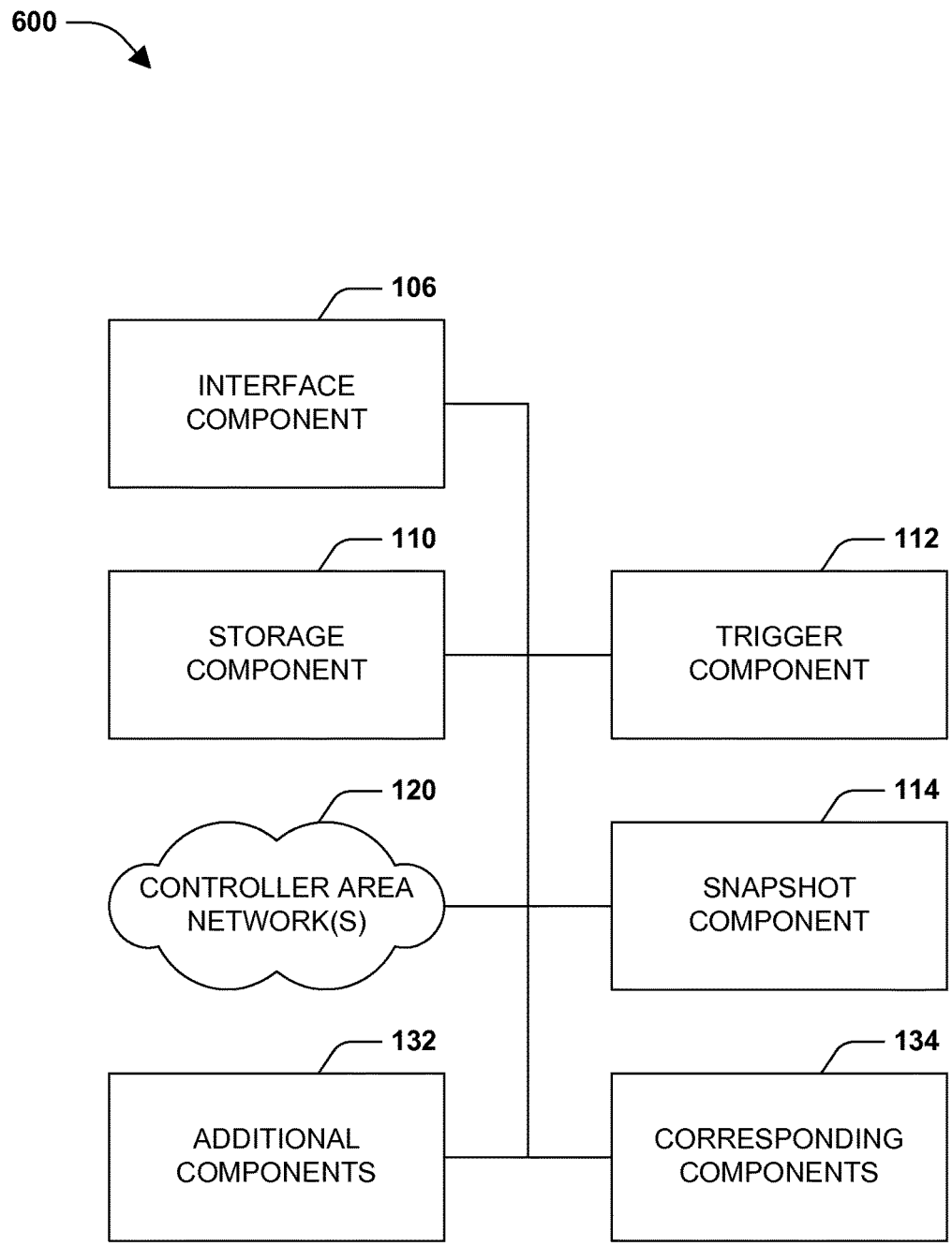
FIG. 6 is an illustration of an example system for customizing diagnostic assistance, according to one or more embodiments.

FIG. 6 is an illustration of an example system 600 for customizing diagnostic assistance, according to one or more embodiments. The system 600 of FIG. 6 can include an interface component 106, a storage component 110, a trigger component 112, a snapshot component 114, one or more corresponding components 134, one or more additional components 132, and one or more CANs 120. Customized diagnostic assistance can be provided when a failure occurs to help identify one or more suspect areas of a vehicle, thereby mitigating an amount of time a technician spends inspecting the vehicle at a dealership or a repair shop, for example. An area can include one or more systems, components, units, sensors, connections, etc. The customized diagnostic assistance can be generated based on collecting or recording data, such as a snapshot, from multiple units, sensors, components, systems, etc. that do not initiate a fault, such as a diagnostic trouble code (DTC), and a configuration of a vehicle. In other words, additional data, additional information, or additional parameters not directly associated with a failure can be collected from multiple sources to facilitate troubleshooting. These additional parameters can be determined based on a configuration of the vehicle. In one or more embodiments, one or more of the components of the system 600 of FIG. 6 can be configured in similar manner as one or more of the components (e.g., corresponding components) of the system 100 of FIG. 1.

A vehicle can include one or more components, systems, units, sensors, CANs, etc. When a component, etc. detects a failure or a malfunction, a diagnostic trouble code (DTC) may be sent over a CAN. For example, one or more of the corresponding components 134 can report a DTC over one or more of the CANs 120. When the DTC is received by the trigger component 112 or one of the CANs 120, the snapshot component 114 can capture or record a snapshot according to a snapshot package based on the DTC and a configuration of the vehicle. In this scenario, the DTC acts as a trigger for recording the snapshot. Stated another way, a snapshot can be triggered by a DTC or a trigger can include a DTC. The snapshot package can be configured to capture or record one or more parameters from one or more additional components 132 that did not send the DTC. The snapshot package can also capture one or more parameters from one or more corresponding components 134, such as a component that sent the DTC, for example. In this way, substantially comprehensive information or data relating to a failure, a malfunction, or a DTC can be captured by a snapshot.

When a snapshot is captured or recorded, the snapshot can be received by or stored in the storage component 110. In one or more embodiments, the snapshot can be accessed via connecting an external device to the interface component 106, which can retrieve the snapshot from the storage component 110 over one or more of the CANs 120. That is, the interface component 106 can be configured to transmit the snapshot to a third party or an external device. For example, when a driver brings a vehicle into a dealership, a technician can connect and external device to the vehicle via the interface component 106, and access a snapshot stored on the storage component 110 over one or more of the CANs 120. In other embodiments, the snapshot can be transmitted remotely, such as via a telematics component (not shown). Additionally, the storage component 110 can be configured to store or be pre-loaded with one or more snapshot packages for different DTCs.

Because a DTC can be indicative of trouble, failures, malfunctions, in a potential trouble area or traced back to a corresponding component that sent the DTC, a DTC can be used as a factor, trigger, or a starting point when troubleshooting. Often, the corresponding component that sent the DTC can be connected, linked, shared, overlapped, have a commonality, etc. with one or more additional components 132, such as one or more systems, one or more units, one or more sensors, etc. In other words, a configuration of a vehicle can be indicative of connections, interactions, commonality, etc. between components, systems, units, sensors, CANs, etc. Generally components, systems, units, sensors, connections, or the like, etc. can be associated with one or more areas. Readings, data, parameters, etc. from these additional components 132 can be used to identify one or more suspect areas, in conjunction with parameters from one or more of the corresponding components 134. Therefore, a corresponding component may or may not be a component that sends or reports a DTC. In one or more embodiments, parameters can be selected for a snapshot package based on the configuration of the vehicle.

Stated another way, a system can include a number of components, interconnected via one or more connections. When a DTC is received from a component initiating the DTC (e.g., a corresponding component 134), data or parameters can be recorded from one or more other components (e.g., additional components 132 or other corresponding components) to facilitate root cause analysis or troubleshooting based on relationships one or more of the other components have with the component that initiated the DTC. Additionally, different snapshot packages can be used for different DTCs. That is, a snapshot package can be selected based on a type of DTC detected. For example, a voltage related DTC can trigger use of a snapshot for capturing voltage parameters, etc. Additionally, other parameters can be captured due to connections that can be obtained based on a configuration of the vehicle. These parameters can be pre-programmed in one or more snapshot packages stored or pre-loaded on the storage component 110 based on a DTC and a configuration of a vehicle. In one or more embodiments, the storage component 110 or the interface component 106 can be configured to receive a configuration of a vehicle. When a DTC is detected by the trigger component 112, the snapshot component 114 can capture the snapshot of one or more parameters over one or more CANs 120 based on the DTC and a corresponding snapshot package, where the snapshot package is determined based on a configuration of the vehicle or a relationship between a component initiating the DTC and one or more additional components. Custom diagnostic assistance can be generated based on the snapshot, the configuration of the vehicle, or the DTC.

Figure 7:
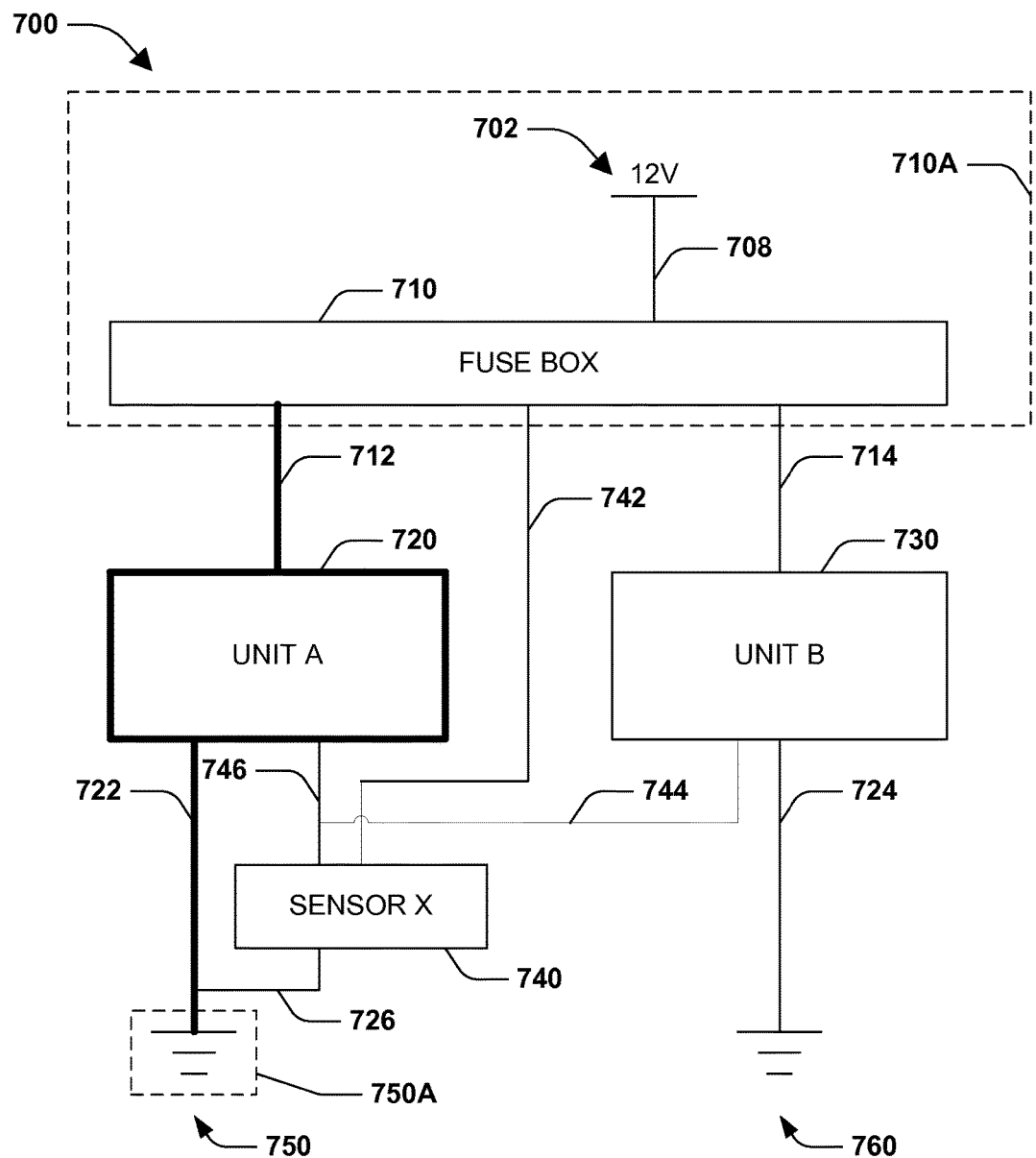
FIG. 7 is an illustration of an example system where customized diagnostic assistance can be provided, according to one or more embodiments.

FIG. 7 is an illustration of an example system 700 where customized diagnostic assistance can be provided, according to one or more embodiments. The system 700 of FIG. 7 can include one or more components, units, connections, sensors, etc. For example, a power supply 702 is connected to a fuse box 710 via connection 708. Sensor X 740, Unit A 720, and Unit B 730 are supplied power via connections 742, 712, and 714 to the fuse box 710, respectively. Additionally, Unit A 720 is connected to a first ground 750 and Unit B is connected to a second ground 760. Sensor X 740 shares the first ground 750 with Unit A 720 via connection 726. Sensor X 740 is configured to report a ground value for the first ground 750 to Unit A 720 and Unit B 730 via connections 746 and 744, respectively. In other words, Units A and B 720 and 730 can receive a sensor value from Sensor X 740, where the sensor value can be normal, marginal, or faulty, for example.

When a component associated with system 700, such as Unit A 720, reports a voltage related DTC, a snapshot of one or more parameters can be captured. As an example, Unit A 720 can report that a reading of 9 volts, rather than an expected 12 volts. Because the DTC is voltage related, a corresponding snapshot package of electrical related parameters can be retrieved. Unit A 720 and Unit B 730 should both report 12 volts, because they are both connected to a 12V power supply 702 through the fuse box 710. As well, this is because the system voltage here is 12 volts. Because Unit A 720 is reporting 9 volts, electrical related snapshot data can be captured for one or more components, systems, units, sensors, etc. of system 700. In this example, snapshot data, measurements, or parameters can be captured from Unit A 720, Unit B 730, and Sensor X 740 to facilitate troubleshooting. In one or more embodiments, a pre-loaded snapshot package can be configured to capture a voltage of Unit B 730 when a DTC is detected, such as by a trigger component, for example. In a scenario where Unit B 730 has a voltage reading of 9 volts or a parameter of Unit B 730 indicates that Unit B is receiving 9 volts, area 710A can be identified as a suspect area, because a faulty fuse box 710 or a faulty power source 702 could result in Unit B 730 sharing a 'bad' voltage reading or parameter as Unit A 720. Conversely, in a scenario where Unit B 730 has a reading of 12 volts or a parameter of Unit B 730 indicates that Unit B is receiving 12 volts, area 710A can be identified as non-suspect for similar reasons.

Additionally, a snapshot package can be configured to capture a sensor status parameter from Unit B 730 relating to a sensor value of Sensor X 740. In a scenario where the sensor status parameter of Unit B 730 is marginal or faulty, area 750A corresponding to the first ground 750 can be identified as a suspect area, because Sensor X 740 reports the sensor status to Unit B 730 and because Unit A 720 and Sensor X 740 are configured to share the first ground 750 via connections 722 and 726. It can also be possible, although highly unlikely, that Unit A 720 and Sensor X 740 are both faulty, or that connections 722 and 726 are faulty. Since these possibilities are less likely to be suspect than area 750A, they can be ranked lower or indicated as such. In this way, the connections 722 and 726 of the vehicle configuration can be used to determine parameters to record for a snapshot package.

In a scenario where the sensor status parameter of Unit B 730 is normal or within a desired range, area 750A corresponding to the first ground 750 can be identified as a non-suspect area, because Sensor X 740 reports to Unit B 730 and because Unit A 720 and Sensor X 740 are configured to share the first ground 750. To this end, if the first ground 750 is faulty, it would be unlikely that Sensor X 740 would report a normal value to Unit B 730. Accordingly, in one or more embodiments, area 750A could be removed from consideration for diagnostic assistance. In other embodiments, area 750A can be ranked as a low probability suspect area. Because Unit B 730 indicates a normal voltage value and area 710A is connected to Unit A 720 and Unit B 730, area 710A can be marked as a non-suspect area, and removed from troubleshooting consideration. In this scenario, a suspect area can be determined include the connection 712 from the fuse box 710 to Unit A 720, the connection 722 from Unit A 720 to the first ground 750, and Unit A 720.

Figure 8:
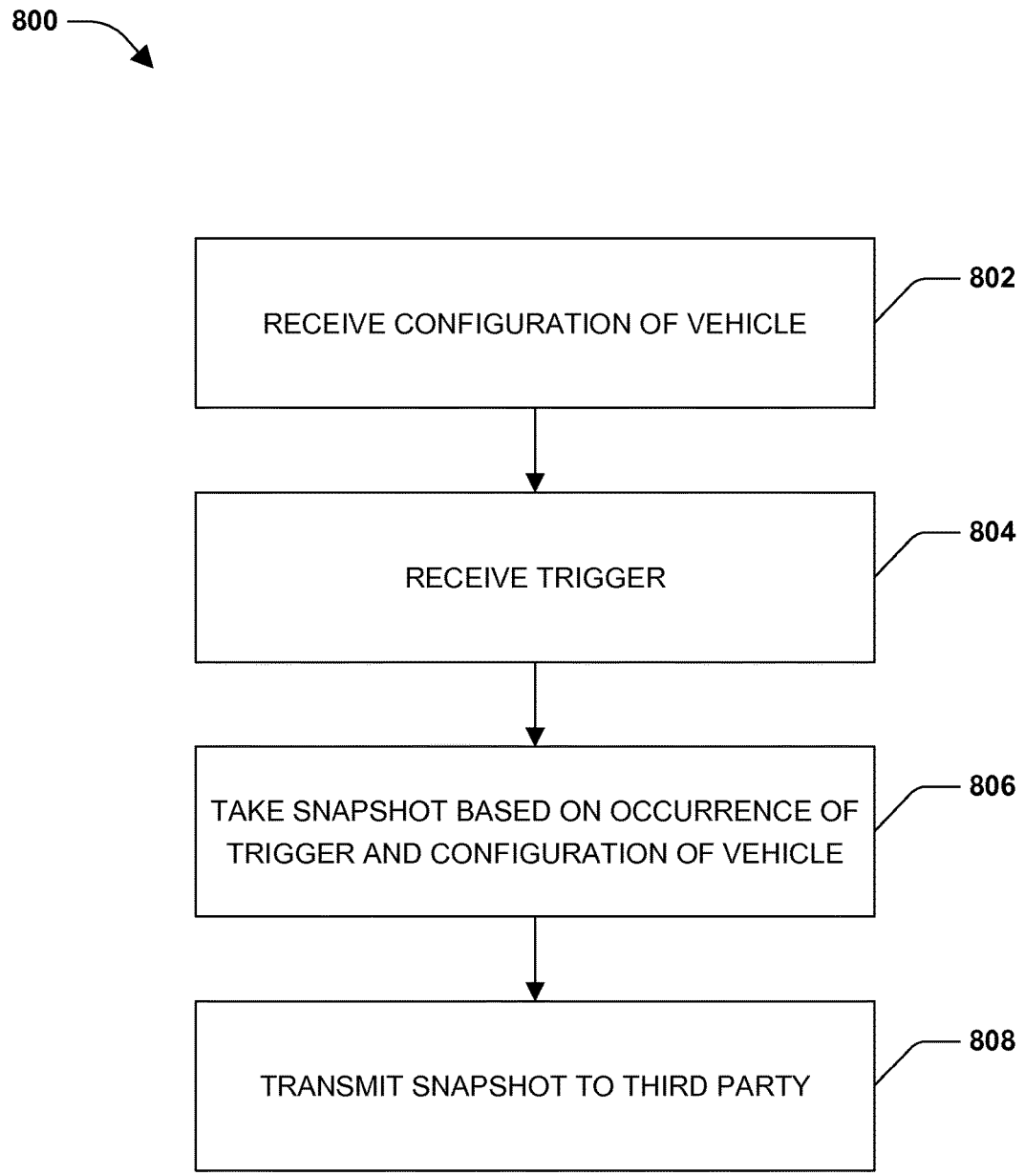
FIG. 8 is an illustration of an example flow diagram of a method for customizing diagnostic assistance, according to one or more embodiments.

FIG. 8 is an illustration of an example flow diagram of a method 800 for customizing diagnostic assistance, according to one or more embodiments. At 802, a configuration of a vehicle can be received. The configuration can include a layout or a construction of a vehicle. For example, a vehicle can include one or more components, one or more systems, one or more units, one or more connections, one or more CANs, one or more sensors, etc. These components can be grouped, designated, or associated with one or more areas during troubleshooting. An area can include one or more components, systems, units, sensors, CANs, features, etc. For example, an area can be classified as suspect, non-suspect, or unknown based on normal, marginal, or other readings from components or sensors. A configuration of a vehicle can indicate one or more shared connections, units in common, overlaps, commonalities, etc. These aspects can be utilized during troubleshooting to reduce a number of areas a technician examines by removing potentially unnecessary or non-suspect areas from consideration.

In one or more embodiments, one or more snapshot packages can be pre-loaded on a vehicle, such as on a storage component of the vehicle, where the snapshot packages can be based on a configuration of a vehicle, and configured to capture a snapshot based on a type of DTC. For example, a voltage related DTC can trigger capturing of a snapshot using a first snapshot package, while another type of DTC can trigger a snapshot to be captured using a second snapshot package, and so forth, because different DTCs are based on different fault criteria. In one or more embodiments, a snapshot package can include a trigger, one or more parameters to be recorded from one or more corresponding components, and a snapshot window. The trigger can be a DTC or a condition related to a parameter. These snapshot packages can be determined or pre-programmed based on a configuration, layout, or construction of a vehicle. As an example, a vehicle configuration can be indicative of one or more shared connections, an overlap between one or more components, an association between one or more components, a relationship between one or more components, or any combination thereof. In other words, parameters or data to be recorded for a snapshot package can be from units, components, etc. associated with a unit or component that reports a failure or a malfunction. A snapshot package can be configured to trigger a capture of a snapshot based on a DTC, a type of DTC, one or more criteria associated with a DTC, a potential or suspected problem, etc.

At 804, a trigger can be received, such as a DTC, for example. The trigger or DTC can be received by a trigger component or a CAN. A snapshot can be taken at 806. For example, the snapshot can be taken in response to the trigger, and be based on a configuration of the vehicle. Taking the snapshot can include recording a set of one or more parameter from one or more corresponding components of the vehicle, and be determined based on the snapshot package. The snapshot package can be configured to capture a snapshot including one or more parameters from one or more associated systems, units, components, sensors, etc. Components can be determined to be associated with other components based on the configuration of the vehicle. For example, a first component can be associated with a second component if they share a ground. In other words, one or more parameters of a snapshot can be selected based on the configuration of the vehicle during snapshot package generation. In this way, snapshot data or parameters can be recorded or captured from multiple systems, units, components, etc. that are not necessarily faulty, failing, reporting a DTC. At 808, the snapshot can be transmitted to a third party.

Figure 9:
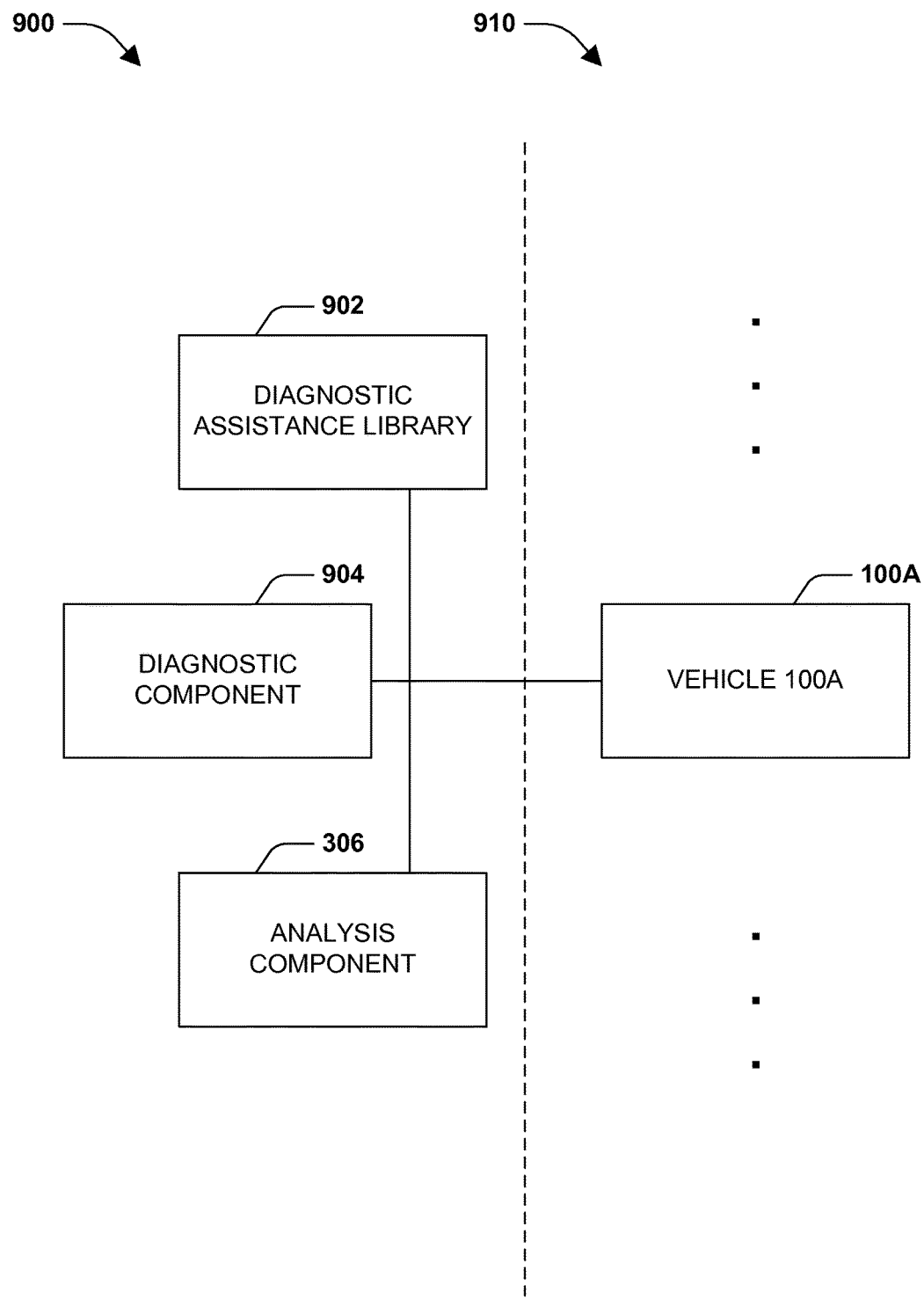
FIG. 9 is an illustration of an example system for customizing diagnostic assistance, according to one or more embodiments.

FIG. 9 is an illustration of an example system 900 for customizing diagnostic assistance, according to one or more embodiments. The system 900 can include a diagnostic assistance library 902, a diagnostic component 904, or an analysis component 306. The system 900 can interface with one or more vehicles 910, such as Vehicle 100A, for example. FIG. 9 may be described with reference to the system 700 FIG. 7. As an example, Vehicle 100A can be configured to include the system 700 of FIG. 7. In this example, the Vehicle 100A can be pre-programmed with a snapshot package that records parameters from Unit A 720, Unit B 730, the power supply 702, and Sensor X 740. The snapshot package can be configured to trigger when a voltage or electrical system related DTC is received. Additionally, the snapshot package can be configured to record or capture one or more of the parameters for a duration or within a snapshot window. Here, when a voltage related DTC is received by a CAN of the Vehicle 100A, a snapshot can be taken. For example, the snapshot can include a system voltage determined to be 12 volts, a Unit B 730 reading of 12 volts, a Unit A 720 reading of 9 volts, and a Sensor X 740 reading that reports a normal ground value to Unit B 730.

The snapshot associated with the voltage related DTC can be stored on a storage component of Vehicle 100A, and accessed via one or more CANs. In one or more embodiments, a diagnostic component 904 can be configured to receive the snapshot from the Vehicle 100A, such as via an interface component or telematics component, for example.

Additionally, the diagnostic component 904 can receive a configuration of the Vehicle 100A. The configuration of the Vehicle 100A can be included in the snapshot sent by the Vehicle 100A or be received from a diagnostic assistance library 902. This information can be used to facilitate root cause analysis, diagnostic assistance, or troubleshooting for Vehicle 100A in relation to a DTC which triggered the snapshot received by diagnostic component 904.

An analysis component 306 can be configured to generate custom diagnostic assistance based on the snapshot and a configuration of the Vehicle 100A. What this means is the custom diagnostic assistance can be specific to an event, failure, DTC, such as a DTC which triggered the snapshot, for example. The analysis component 306 can receive a snapshot from the diagnostic component 904, the Vehicle 100A, or an interface component of Vehicle 100A. In this example, with reference to FIG. 7, the snapshot can include a system voltage determined to be 12 volts, a Unit B 730 reading of 12 volts, a Unit A 720 reading of 9 volts, and a Sensor X 740 reading that reports a normal ground value to Unit B 730. The snapshot in this scenario was triggered by a voltage related DTC for system 700 of FIG. 7.

The analysis component 306 can be configured to identify one or more areas associated with system 700 by analyzing a configuration of the system 700 (e.g., which can be received from the diagnostic assistance library 902, the diagnostic component 904, the Vehicle 100A, or stored on a storage component of the Vehicle 100A, etc.). Here, the system 700 includes components, such as a power source 702, a fuse box 710, Unit A 720, Unit B 730, Sensor X 740, a first ground 750, a second ground 760, and one or more connections there-between, etc. An area can be a grouping of one or more of the components. In other words, an area can be associated with one or more corresponding components, one or more additional components, one or more systems, one or more units, one or more sensors, one or more connections, or one or more controller area networks (CANs) of the vehicle. Stated another way, troubleshooting for a DTC can include analyzing snapshot data triggered by a DTC and dividing a configuration of a vehicle into one or more partitions or segments accordingly.

The analysis component 306 can be configured receive a set of one or more diagnostic assistance suggestions from a diagnostic assistance library 902. For example, one or more of the diagnostic assistance suggestions can be made based on a DTC which triggered the snapshot received by the diagnostic component 904. In other words, when a DTC occurs on a vehicle, a snapshot can be taken from the vehicle in response to the DTC, where parameters of the snapshot can be determined based on a configuration of the vehicle. When this snapshot is received by the diagnostic component 904, the analysis component 306 can pull diagnostic assistance suggestions from the diagnostic assistance library based on the snapshot, which can be indicative of the DTC or the type of DTC associated with Vehicle 100A. These diagnostic assistance suggestions can be related to one or more areas to be considered for troubleshooting the DTC. For example, an area can include one or more components, one or more systems, one or more units, one or more sensors, one or more connections, or one or more CANs, etc. that did not necessarily initiate, send, or transmit a DTC. This means that these areas may be linked to a component which initiated a DTC via one or more connections, relationships, links, etc. As an example, the diagnostic assistance suggestions can include instructions to inspect the power supply 702, the fuse box 710, Unit A 720, Unit B 730, the first ground 750, the second ground 760, Sensor X 740, and the respective connections for system 700. However, the analysis component 306 can customize the diagnostic assistance instructions to mitigate a number of components to inspect. Further, the analysis 306 component can rank one or more of the diagnostic assistance instructions based on a likelihood of failure.

The analysis component 306 can classify one or more of the areas, components, systems, units, sensors, connections, etc. as suspect, non-suspect, normal, marginal, unknown, etc. based on snapshot data and the configuration of the vehicle, such as Vehicle 100A. For example, area 710A can be classified as non-suspect because Unit B 730 has a 12 volt reading and the fuse box 710 is shared between Unit A 720 and Unit B 730. Components above the fuse box 710 can be included in area 710A due to the normal voltage reading from Unit B 730. Similarly, area 750A can be classified as non-suspect due to the normal sensor status associated with Sensor X 740 (e.g., which is provided by connection 744 to Unit B 730).

In one or more embodiments, connection 712, connection 722, and Unit A 720 can be grouped into an area and classified as a suspect area because 710A is non-suspect, and 750A is non-suspect. To this end, the analysis component 306 can be configured to remove non-suspect areas from diagnostic assistance. In this way, one or more suspect areas or problems area can be identified and non-suspect areas can be filtered or removed from consideration, thereby reducing a number of components a technician may need to examine in order to diagnose a problem arising from a DTC. For example, a subset of diagnostic assistance suggestions can be determined by removing one or more of the diagnostic assistance suggestions from consideration, such as the diagnostic assistance suggestions classified as non-suspect. In other words, the subset can be provided based on the classification of one or more of the areas or components, for example. In one or more embodiments, a diagnostic assistance suggestion can include an instruction to inspect one or more areas classified as suspect and be ranked based on a likelihood of failure or historical data compiled within the diagnostic assistance library 902.

Additionally, the analysis component 306 can be configured to generate an event report which includes a summary of one or more of the parameters from the snapshot. Further, the analysis component 306 can be configured to cross reference a repair history associated with a vehicle to rank, filter, remove, or add diagnostic assistance suggestions to custom diagnostic assistance. In one or more embodiments, the analysis component 306 can be off board of the Vehicle 100A, as illustrated in FIG. 9. In other embodiments, the analysis component 306 can be on board the Vehicle 100A, as will be described in FIG. 11.

Figure 10:
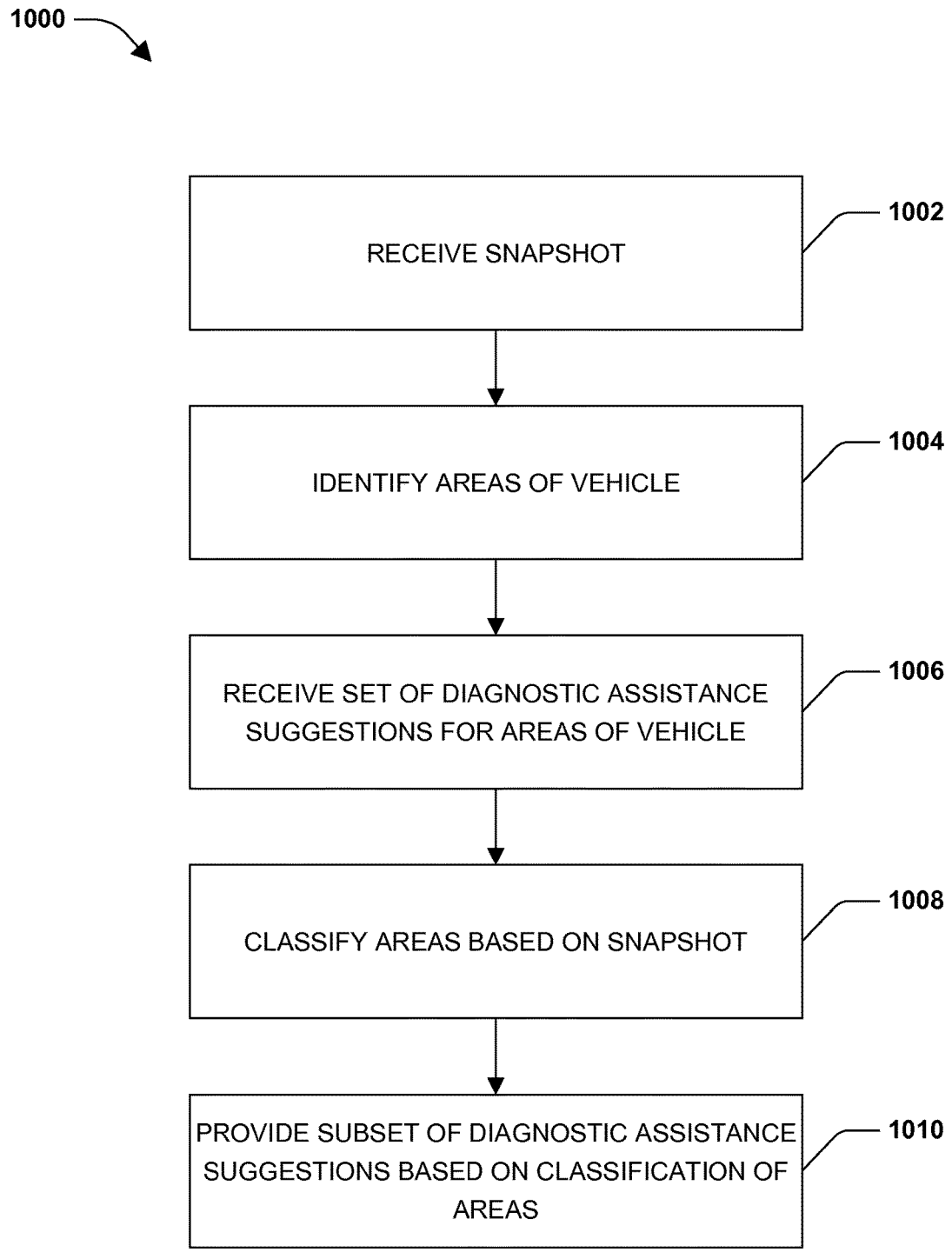
FIG. 10 is an illustration of an example flow diagram of a method for customizing diagnostic assistance, according to one or more embodiments.

FIG. 10 is an illustration of an example flow diagram of a method 1000 for customizing diagnostic assistance, according to one or more embodiments. At 1002, a snapshot can be received, such as from a vehicle, via a telematics channel or an interface of the vehicle. At 1004, one or more areas can be identified. The areas can be potential suspect areas associated with a component that initiated a DTC on the vehicle. For example, an area can include one or more systems, components, CANs, units, sensors, connections, etc. At 1006, a set of one or more diagnostic assistance suggestions can be received. The diagnostic assistance suggestions may correlate or correspond to one or more areas, potential suspect areas, systems, components, units, sensors, CANs, connections, etc. At 1008, one or more areas can be classified. These areas can be classified based on the snapshot received at 1002 and a configuration of the vehicle. At 1010, a subset of diagnostic assistance suggestions can be provided based on the classification of the areas. In other words, the subset can be determined by removing non-suspect areas from consideration.

Figure 11:
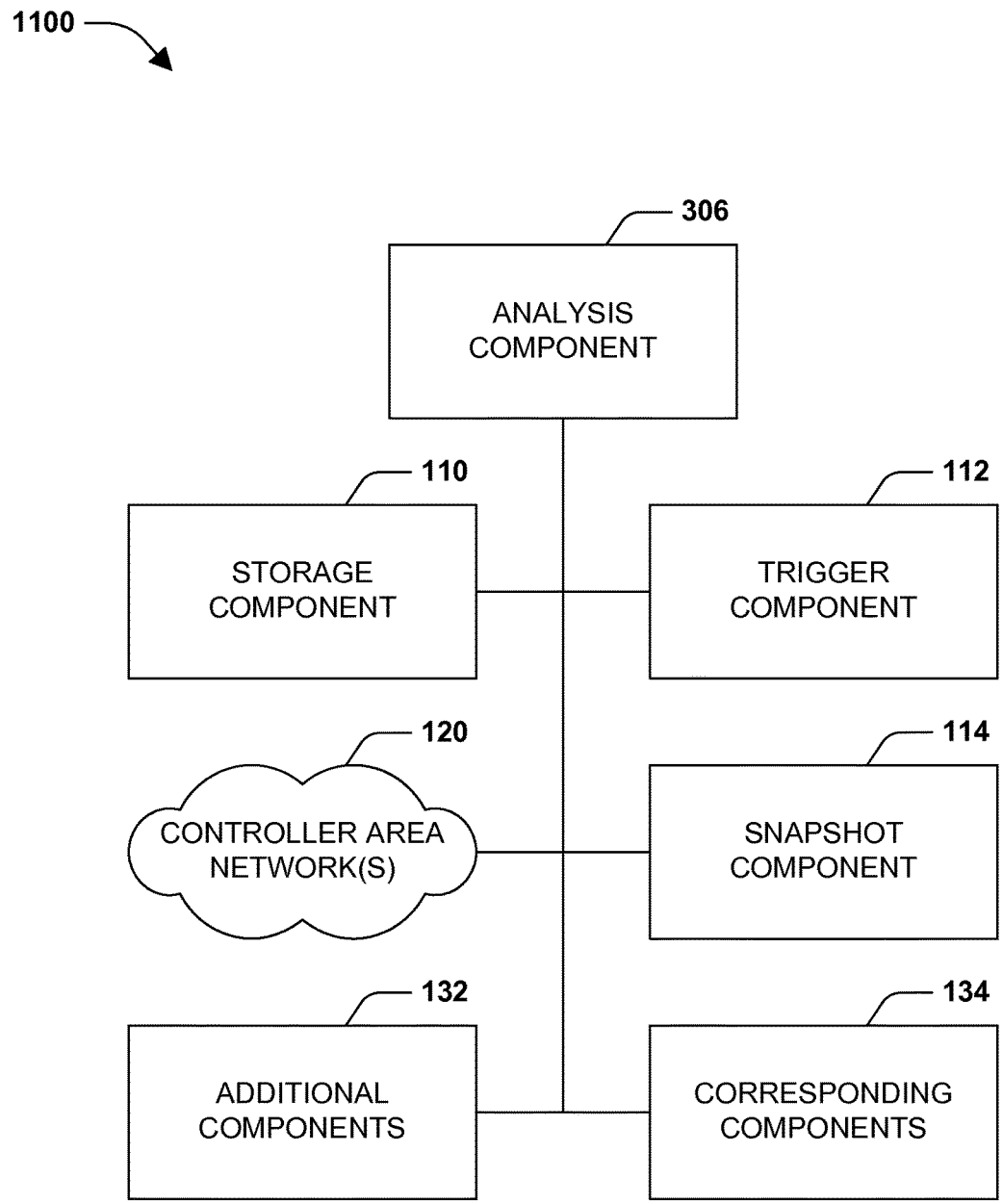
FIG. 11 is an illustration of an example system for customizing diagnostic assistance, according to one or more embodiments.

FIG. 11 is an illustration of an example system 1100 for customizing diagnostic assistance, according to one or more embodiments. FIG. 11 is similar to FIG. 6, except that the system 1100 of FIG. 11 includes an analysis component 306 on board, rather than off board, as illustrated in FIG. 9. The analysis component 306 of FIG. 11 can be configured in a similar manner as the analysis component of FIG. 9. For example, the analysis component 306 can be configured to generate custom diagnostic assistance based on a snapshot taken by the snapshot component 114. Further the analysis component 306 can be configured to generate an event report including a summary of one or more parameters of the snapshot.

Figure 12:
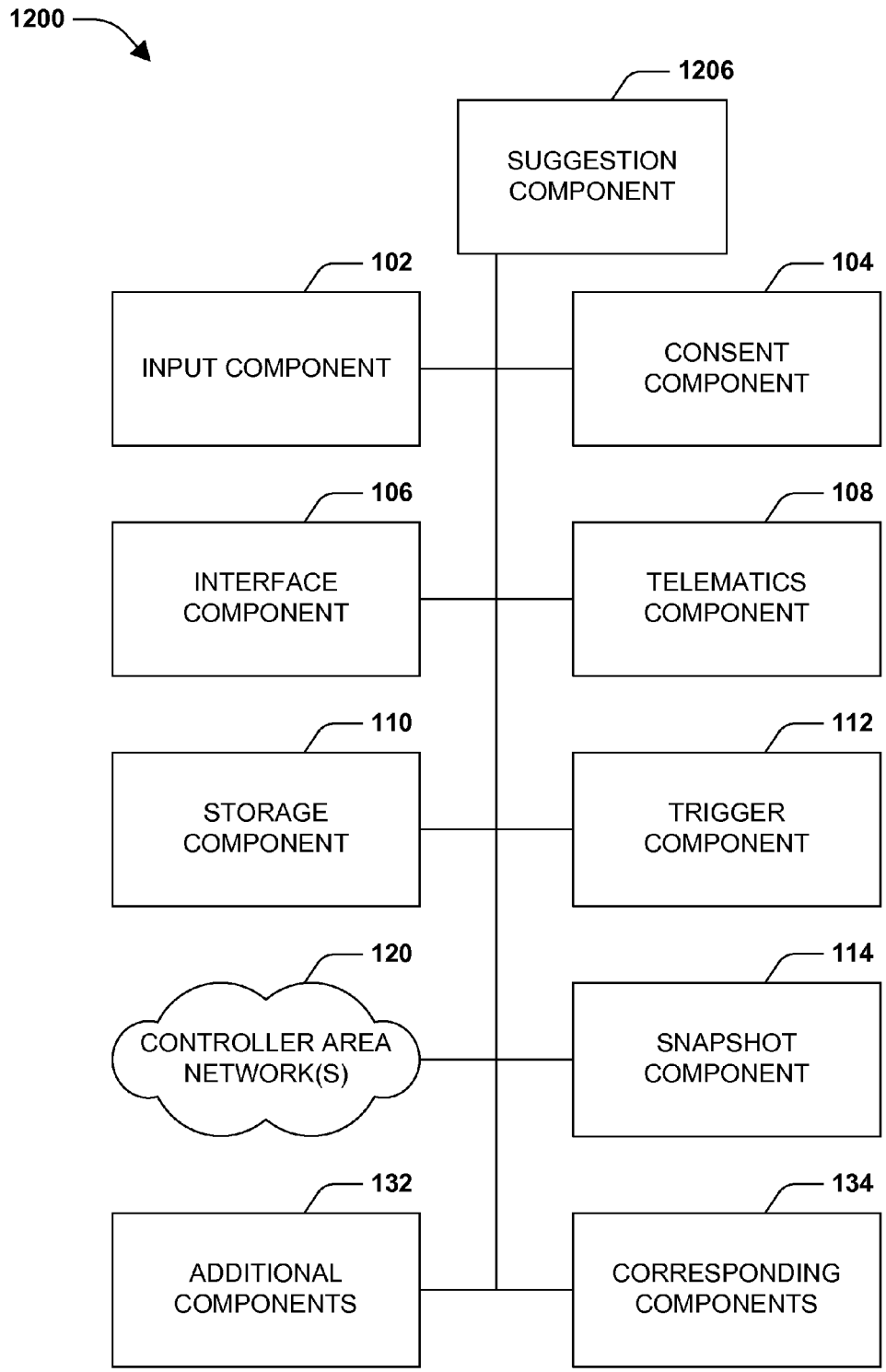
FIG. 12 is an illustration of an example system for providing driving analytics, according to one or more embodiments.

FIG. 12 is an illustration of an example system 1200 for providing driving analytics, according to one or more embodiments. The system 1200 can include an input component 102, a consent component 104, an interface component 106, a telematics component 108, a storage component 110, a trigger component 112, a snapshot component 114, one or more corresponding components 134, one or more additional components 132, one or more CANs 120, and a suggestion component 1206. The system 1200 for providing driving analytics can be configured to provide a driver of a vehicle with one or more suggestions to mitigate wear and tear on a vehicle.

According to one or more embodiments, the suggestions can be provided in a variety of ways. For example, a driver could initiate a voice command or a request for assistance, by asking, "Why do my tires wear so quickly" or "I need help with my tires". The input component 102 can receive the voice command, route the voice command over one or more CANs 120 to the telematics component 108, which could transmit the voice command off board, such as to a third party or a server, where it may be determined that the driver should be enrolled in a driving analytics program. In response to this, the consent component 104 can be configured to prompt the driver of the vehicle to enroll in a driving analytics program, such as through a display or an audio prompt.

The driving analytics program could utilize the snapshot component 114 and the trigger component 112 to track the driving habits of the driver. These driving habits could then be analyzed or used to provide suggestions for mitigating wear and tear on the vehicle. Driving habits can generally include one or more driving actions of a driver. For example, a driving action can be a hard brake, a quick acceleration, a sharp turn, etc. Driving actions may be associated with an action taken by a driver which causes a corresponding sensor to exceed a threshold. As an example, a quick acceleration may be associated with a longitudinal G-sensor reading which exceeds a threshold.

In one or more embodiments, the consent component 104 can be configured to prompt the driver of a vehicle to enroll or opt into a driving analytics program based on one or more observed driving habits, driving patterns, or driving actions of the driver. In other words, the consent component 104 can be configured to prompt enrollment based on snapshot data or characteristics indicative of aggressive driving, such as tread depth, etc. That is, if it is observed that tires of a vehicle are on pace to wear out more quickly than recommended, the consent component 104 could prompt the driver of the vehicle to enroll in a driving analytics program. In other embodiments, a driver can be prompted to enroll at a dealership, such as when a technician observes a low tread depth. The consent component 104 can prompt a driver for consent utilizing the interface component 106 to display a message for prompting the driver to enroll. For example, the interface component can be configured to display scrolling text, such as, "Did you know that at the rate you're driving, you'll require an oil change 1,000 miles sooner than the average driver? To enroll in a driving analytics program for driving suggestions or analysis, please press and hold the power button on your radio now". In response, a driver could enroll in the driving analytics program by making a selection through the input component 102 (e.g., pressing and holding the power button) or replying with a voice command (e.g., through an audio component, not shown), such as "I accept" or "Please enroll me". The input component 102 can be configured to pass a response from the driver to the consent component 104 or the telematics component 108, thereby enrolling (or not enrolling) the driver based on the response or selection.

The storage component 110 can be configured to receive or store one or more snapshot packages for driving analytics. In one or more embodiments, driving analytics snapshot packages can be pre-loaded or pre-programmed within the storage component 110. The parameters of the snapshot can generally be measured from one or more corresponding components. A snapshot package can include a trigger configured to capture data associated with wear and tear of a vehicle when a threshold of a parameter is exceeded, such as a yaw rate, horizontal G-sensor, longitudinal G-sensor, steering angle, speed, acceleration, deceleration, vertical G-sensor, etc. Similarly, one or more parameters of the snapshot package can be indicative of a driving pattern of a driver, and include the wear and tear parameters, such as a yaw rate, horizontal G-sensor, longitudinal G-sensor, steering angle, speed, acceleration, deceleration, vertical G-sensor, etc. In one or more embodiments, the snapshot package can be configured to capture global positioning system (GPS) data associated with the vehicle. This GPS data can be used to facilitate predictions of when and where a driver will take a driving action associated with wear and tear on a vehicle.

In one or more embodiments, a snapshot package can be customized or generated off board of the vehicle, and received by the telematics component 108. In these embodiments, the snapshot package may be generated based on attributes or components of interest to the driver. For example, if a driver asks, "Please monitor my tire wear for me", the input component 102 can receive this request, pass it to the consent component 104 or telematics component 108 via one or more CANs 120, and receive a snapshot package from a third party via the telematics component 108. Here, the snapshot package can be configured to capture one or more parameters related to or associated with tire wear. For example, the snapshot package may include acceleration readings, horizontal G-sensor readings, steering angle, yaw rate, etc. In one or more embodiments, the snapshot package can be configured to trigger based on a condition or trigger based on a time interval, as to collect a broader set of data to analyze. This would enable a parameter versus time analysis. For example, by collecting snapshot data when a driver is driving, it could be determined that a driver drives quickly in the morning due to a commute to work and slower in the evening, when leaving. In this scenario, the suggestion component 1206 can suggest that the driver leave the house ten minutes earlier to mitigate tire wear so that the driver will not be rushed. Therefore, the suggestion component 1206 can be configured to provide suggestions that do not directly relate to driving slower. In this example, the suggestion can be based on a level of anxiety associated with the driver due to traffic or work pressure, for example. In other embodiments, the suggestion component 1206 can suggest that the driver slow down or take turns less hard.

The trigger component 112 can be configured to monitor one or more CANs 120 for an occurrence of a trigger for a snapshot package stored by the storage component 110. When the trigger component 112 detects an occurrence of the trigger, the snapshot component 114 can issue a record data command across one or more CANs 120 so that corresponding components 134 or additional components 132 capture or record one or more of the parameters according to the snapshot package. A resulting snapshot can be stored in the storage component 110.

The telematics component 108 can be configured to transmit a snapshot to a third party, by way of a telematics channel, for example. A snapshot can be passed from a storage component 110 over one or more CANs 120 to the telematics component 108 for transmission. The third party may analyze the snapshot off board, generate, and transmit one or more driving analytics suggestions to the vehicle. The telematics component 108 can be configured to receive one or more of the driving analytics suggestions from the third party.

The suggestion component 1206 can be configured to provide suggestions or analysis to the driver related to wear and tear. In other words, the suggestions or analysis can enable a driver to understand why components of his or her vehicle wear at the rate they wear. Driving analytics suggestions or analysis can be provided based on the snapshot taken by the snapshot component 114. These suggestions can be made to improve fuel economy, tire wear, brake wear, engine wear, wear on rotors and pads, etc. In one or more embodiments, the suggestion component 1206 can utilize the interface component 106 to display scrolling text, or to flash a light or LED to alert a driver when an action of the driver is determined to impact wear and tear on the vehicle or components of the vehicle in a negative manner.

In one or more embodiments, the suggestion component 1206 can be configured to generate a report indicative of one or more driving patterns of a driver. For example, the report can be a summary of one or more driving patterns or driving actions associated with a driver. If a driver often accelerates unnecessarily before stopping at a red light at an intersection, the suggestion component 1206 can note this pattern and provide suggestions accordingly. For example, a driving analytics suggestion could instruct a driver to not accelerate quickly when an intersection with a traffic light is approaching based on GPS data from the telematics component 108 and driving patterns from a snapshot. Additionally, if a driver brakes harder during certain times of the day, days of the week, seasons, etc., the suggestion component 1206 can note the braking pattern. Additionally, driving patterns can be geographical. For example, a driver may drive more aggressively within a home region or a radius from a familiar region. In this way, the suggestion component 1206 can be configured to determine driving patterns for a driver.

Further, these driving patterns can be reported to the driver in a report or a driving report. A driving report may be a summary or a collection of details, patterns, trends, statistics, etc. associated with a driver. For example, a driving report may include average speed, number of hard brakes, habits that should be changed (e.g., such as accelerating to a red light), driving styles, fuel economy, etc. In one or more embodiments, the suggestion component 1206 can be configured to prepare a driving report card for the driver. For example, a driver may score well with regard to fuel economy because the car is a gasoline electric hybrid, but score poorly in another category, such as tire wear because the driver takes turns too hard. In one or more embodiments, the driving report card can rank the driver against one or more other drivers participating in the driving analytics program.

In one or more embodiments, the suggestion component 1206 can be configured to suggest different tiers of automobile insurance coverage based on a snapshot, a driving report, or a driving report card. The snapshot can effectively be raw data collected by the vehicle, while the driving report may be a summary of driving patterns or driving actions over a period of time. As an example, the suggestion component 1206 can be configured to suggest higher coverage limits to an aggressive driver associated with multiple sharp turns, hard brakes, quick acceleration, etc.

Additionally, the suggestion component 1206 can be configured to coach a driver with suggestions on how to improve his or her driving habits or actions. The suggestion component 1206 can be configured to present one or more driving analytics suggestions based on an audio prompt or a display. For example, the suggestion component 1206 can interface with an audio component to play a tone when a driver accelerates too quickly. In one or more embodiments, the audio prompt can include a message, such as, "slow down to X miles per hour". Further, the suggestion component 1206 can be coupled with the telematics component 108 to provide suggestions to a driver in real time as they are driving. For example, the suggestion component 1206 could be configured to alert a driver that the driver committed an action that could be associated with reducing a lifespan of a component of the vehicle, such as, "That turn was too fast, try ten miles per hour next time" or "If you continue taking turns at this speed, your tires will need to be replaced at 80,000 miles rather than 100,000 miles".

Further, the suggestion component 1206 can be configured to make driving analytics suggestions related to the maintenance of one or more components of a vehicle. For example, the suggestion component 1206 could be configured to complement a check engine light with a comment on a lifespan of a component of the vehicle. For example, if a check engine light comes on that is related to tire wear, the suggestion component 1206 could provide a suggestion to the driver, such as, "Please replace your tires soon or around 50,000 miles, as this is due to your driving habits. If you would like to extend the life of your next set of tires, please enroll in the driving analytics program and follow the prompts accordingly".

In one or more embodiments, the suggestion component 1206 can be configured to provide suggestions in advanced based on a proposed route or predicted route provided by the telematics component 108. For example, if a driver has entered a destination on a GPS unit, the telematics component 108 can calculate a route from a current location of the vehicle to the destination. Along the route, when a turn is being approached, the suggestion component 1206 can be configured to provide driving analytics suggestions in advance of a potential, anticipated, or predicted driver action that may negatively impact vehicle wear and tear. In other words, if a driver has a history of taking turns too quickly, the suggestion component 1206 can interface with the telematics component 108 to determine one or more potential problem driving areas (e.g., such as a turn) and provide the driver with driving analytics suggestions prior to the driver reaching one or more of the potential problem driving areas. Here, if a driver is approaching a turn (e.g., that is a threshold distance of 100 yards away), the suggestion component 1206 can be configured to issue a warning, "slow down to ten miles per hour before turning right onto Main Street". Stated another way, the suggestion component 1206 can be configured to predict or anticipated an action of a driver based on a driving pattern or snapshot data from the driver, and issue a preventative warning to the driver in advance so the driver can mitigate wear and tear on the vehicle, such as by mitigating the predicted action. In this way, the suggestion component can be configured to predict one or more driving actions of a driver.

Further, topological data can be used to predict a driver action. For example, if a turn is located at a bottom of a steep hill, the suggestion component 1206 may predict that a driver will take that turn too hard or too quickly. In one or more embodiments, the suggestion component 1206 can be configured to provide one or more driving analytics suggestions based on the topological data, driving patterns of the driver, or snapshot data, etc. For example, the suggestion component 1206 can suggest that a driver downshift to a lower gear at a top of a hill to mitigate tire wear from the turn at the bottom of the hill. In this way, one or more driving analytics suggestions can be presented to the driver based on a predicted driving action for the driver of the vehicle, thereby coaching a driver to mitigate wear and tear or improve fuel economy, etc.

Figure 13:
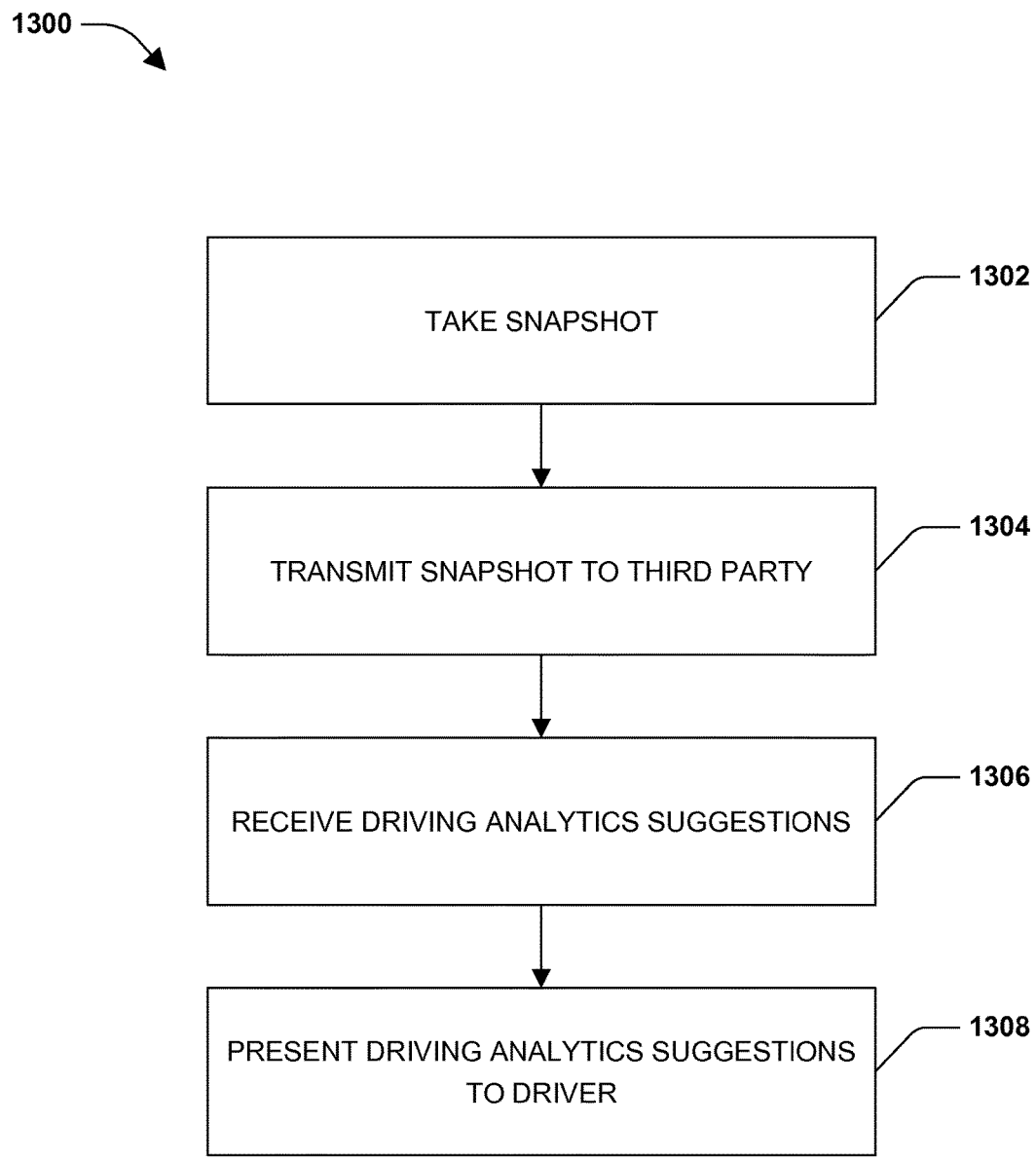
FIG. 13 is an illustration of an example flow diagram of a method for providing driving analytics, according to one or more embodiments.

FIG. 13 is an illustration of an example flow diagram of a method 1300 for providing driving analytics, according to one or more embodiments. At 1302, a snapshot of one or more parameters can be recorded from one or more corresponding components of a vehicle. One or more of the parameters of the snapshot can be related to wear and tear of the vehicle or driving patterns of the driver. The snapshot can be captured based on a trigger or set to record in a continuous, discrete, manner. At 1304, the snapshot can be transmitted to a third party, such as via a telematics channel, for example. The third party can analyze the snapshot to determine one or more driving patterns or one or more driving actions of the driver. Additionally, the third party can generate one or more driving analytics suggestions and transmit one or more of the driving analytics suggestions to a vehicle. At 1306, one or more of the driving analytics suggestions can be received, such as via a telematics channel. At 1308, one or more of the driving analytics suggestions can be presented to the driver. The driving analytics suggestions can be presented based on an alert, an audio prompt, a display, flashing lights, a report, a text, email, etc.

Figure 14:
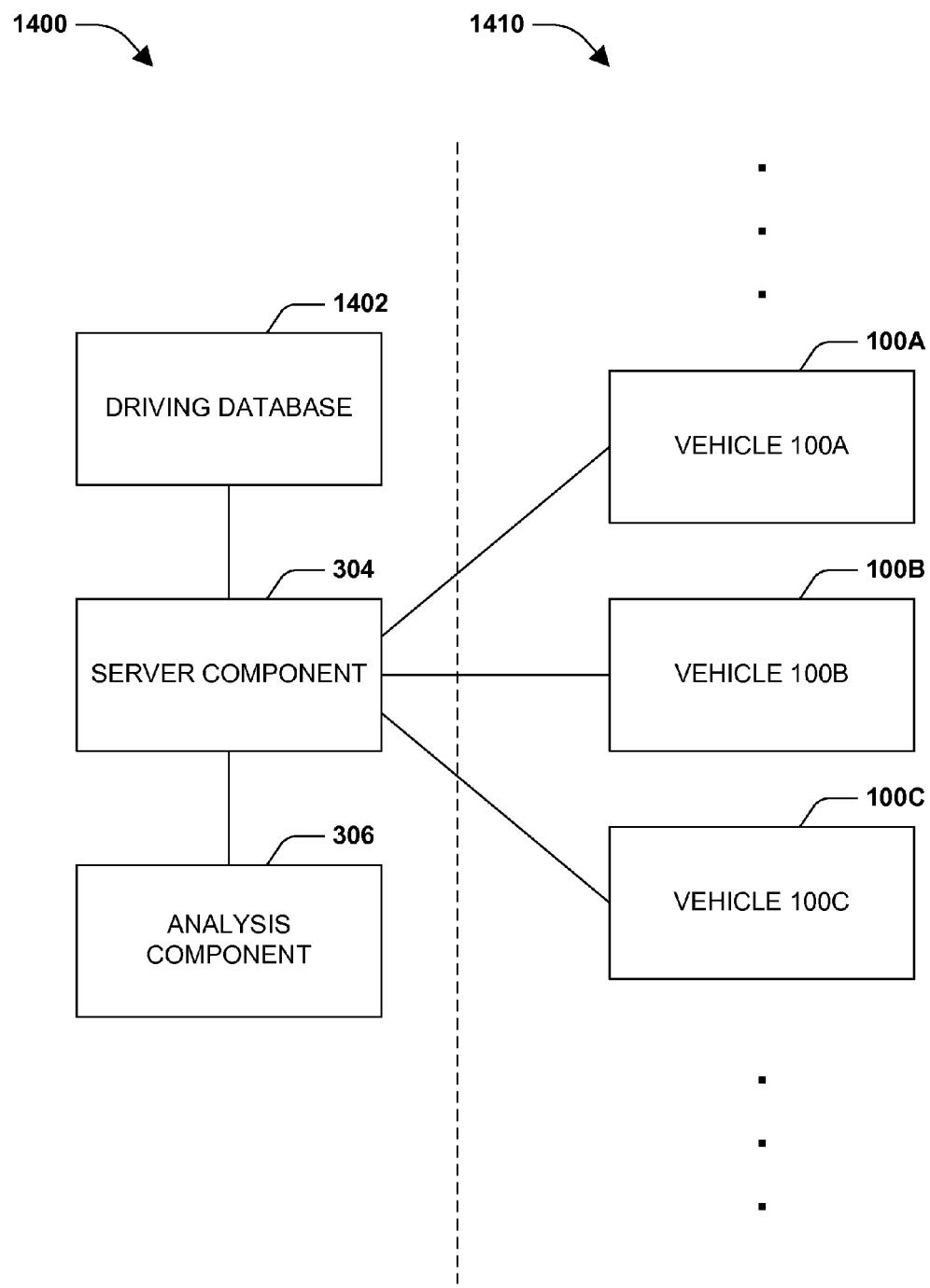
FIG. 14 is an illustration of an example system for providing driving analytics, according to one or more embodiments.

FIG. 14 is an illustration of an example system 1400 for providing driving analytics, according to one or more embodiments. The system 1400 can include a driving database 1402, a server component 304, and an analysis component 306. In one or more embodiments, the system 1400 can be configured to receive one or more snapshots from one or more vehicles 1410 and generate driving analytics suggestions for respective vehicles 1410. In one or more embodiments, a package component (not shown) can be configured to customize or generate a snapshot package based on a request initiated by a driver (e.g., such as fuel economy, tire wear, brake wear, etc.). The server component 304 or an external device (not shown) can transmit the snapshot package to one or more vehicles 1410. In other embodiments, a vehicle, such as vehicle 100A, can be pre-loaded or pre-programmed with one or more snapshot packages.

The server component 304 can be configured to receive a snapshot, where the snapshot includes a set of one or more parameters from one or more corresponding components of a vehicle. Snapshots can be stored in a driving database 1402 for future reference or to create a historical database. In this way, trends can be analyzed across multiple vehicles or across multiple regions. For example, drivers in on the East Coast may drive more aggressively, on the whole, than drivers from the Midwest. In this way, driving analytics suggestions can be tuned by region. As an example, a driver in New York may be more aggressive with regard to tire wear due to traffic, but still be interested in fuel economy. As such, driving analytics suggestions can be presented or filtered by region.

In one or more embodiments, the analysis component 306 can be configured to analyze the snapshot or parameters of the snapshot and generated one or more driving analytics suggestions based on the snapshot. This means that the analysis component 306 can determine trends from the snapshot data or in conjunction with other data, such as time, a GPS trace, topological data, etc. One or more of the driving analytics suggestions can be presented to the driver to improve fuel economy and wear and tear on components of the vehicle.

Additionally, the analysis component 306 can be configured to generate a driving report or a driving report card based on the snapshot or data from the driving database 1402. In one or more embodiments, thresholds for triggering the snapshot can be obtained from the driving database 1402. For example, average values for one or more parameters can be used to populate parameters used to trigger a snapshot. Similarly, portions of the driving report card can be generated based on data from the driving database 1402. As an example, a driver can be ranked against drivers within the same state, city, locality, etc. by comparing snapshot data for the driver against snapshot data of other drivers stored in the driving database 1402.

In one or more embodiments, the driving database 1402 can store historical snapshots and GPS data from the driver and the analysis component 306 can determine one or more driving habits or driving patterns accordingly. For example, if a driver tends to brake hard at a specific intersection, the snapshots and GPS data from the driving database 1402 can be used to determine such a driving pattern. Further, the analysis component 306 can generate one or more driving analytics suggestions or a driving report that is indicative of this driving pattern. Accordingly, a predicted driving action can be determined based on a bearing of a driver or a route the driver is taking and the driving pattern or a series of snapshots. As an example, a driving analytics suggestion could be provided to the driver prior to the driver reaching the intersection, "Dear driver, you are approaching the intersection of X and Y where you often brake quickly. Please reduce your speed gradually". In this way, telematics or GPS data can be utilized in conjunction with the snapshot or a series of snapshots from the driving database 1402 to predict a driving action and provide driving analytics suggestions accordingly. In other words, historical snapshots or driving patterns can be used to predict driving actions of a driver.

In one or more embodiments, the server component 304 can be configured to transmit one or more of the driving analytics suggestions to the vehicle. For example, the transmitting can be based on a telematics channel. The vehicle can receive one or more of the driving analytics suggestions and present one or more of the driving analytics suggestions to the driver of the vehicle.

Figure 15:
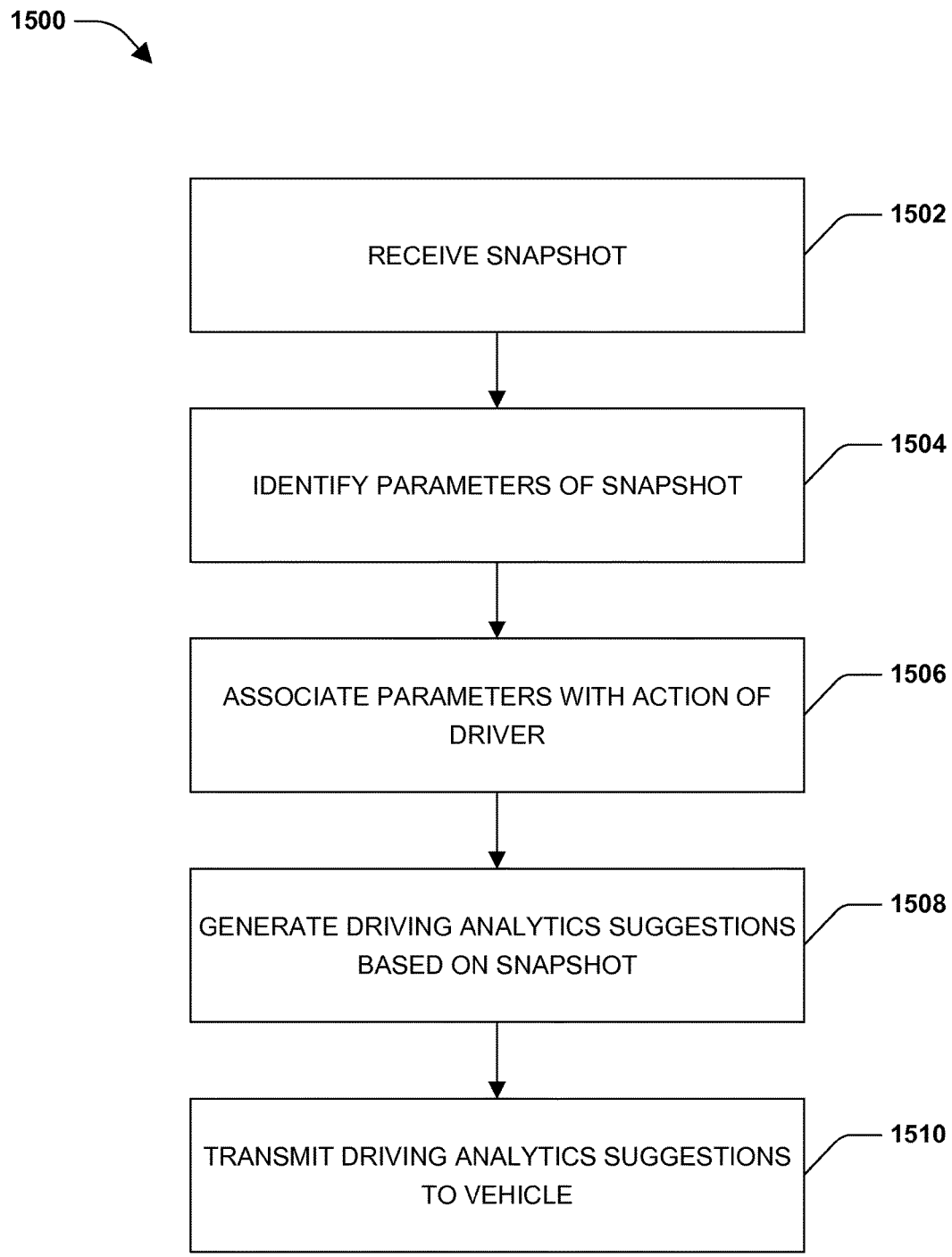
FIG. 15 is an illustration of an example flow diagram of a method for providing driving analytics, according to one or more embodiments.

FIG. 15 is an illustration of an example flow diagram of a method 1500 for providing driving analytics, according to one or more embodiments. At 1502, a snapshot can be received. The snapshot can be received from a vehicle and include GPS data, a GPS trace, one or more parameters from one or more components or corresponding components, one or more corresponding timestamps. At 1504 one or more parameters of the snapshot can be identified. At 1506, different parameters or aspects of different parameters can be associated or attributed to an action of a driver. For example, a delta in a longitudinal G-sensor can be associated with an acceleration or a brake made by a driver. Effectively, parameters of the snapshot can be mapped to actions taken by the driver at 1506. At 1508, one or more driving analytics suggestions can be generated based on the snapshot. Additionally, driving analytics suggestions can be generated based on a series of snapshots, corresponding GPS data or a GPS trace, other data from a driving database, etc. In one or more embodiments, a driving report or a driving report card can be generated in a similar manner. At 1510, one or more of the driving analytics suggestions can be transmitted to the vehicle.

One or more components described with reference to one figure herein can be the same component or a different component in another figure. For example, the snapshot component 114 of FIG. 1 can be the same as the snapshot component 114 of FIG. 12. As another example, the analysis component 306 of FIG. 3 may not necessarily be the same as the analysis component 306 of FIG. 5.

Figure 16:
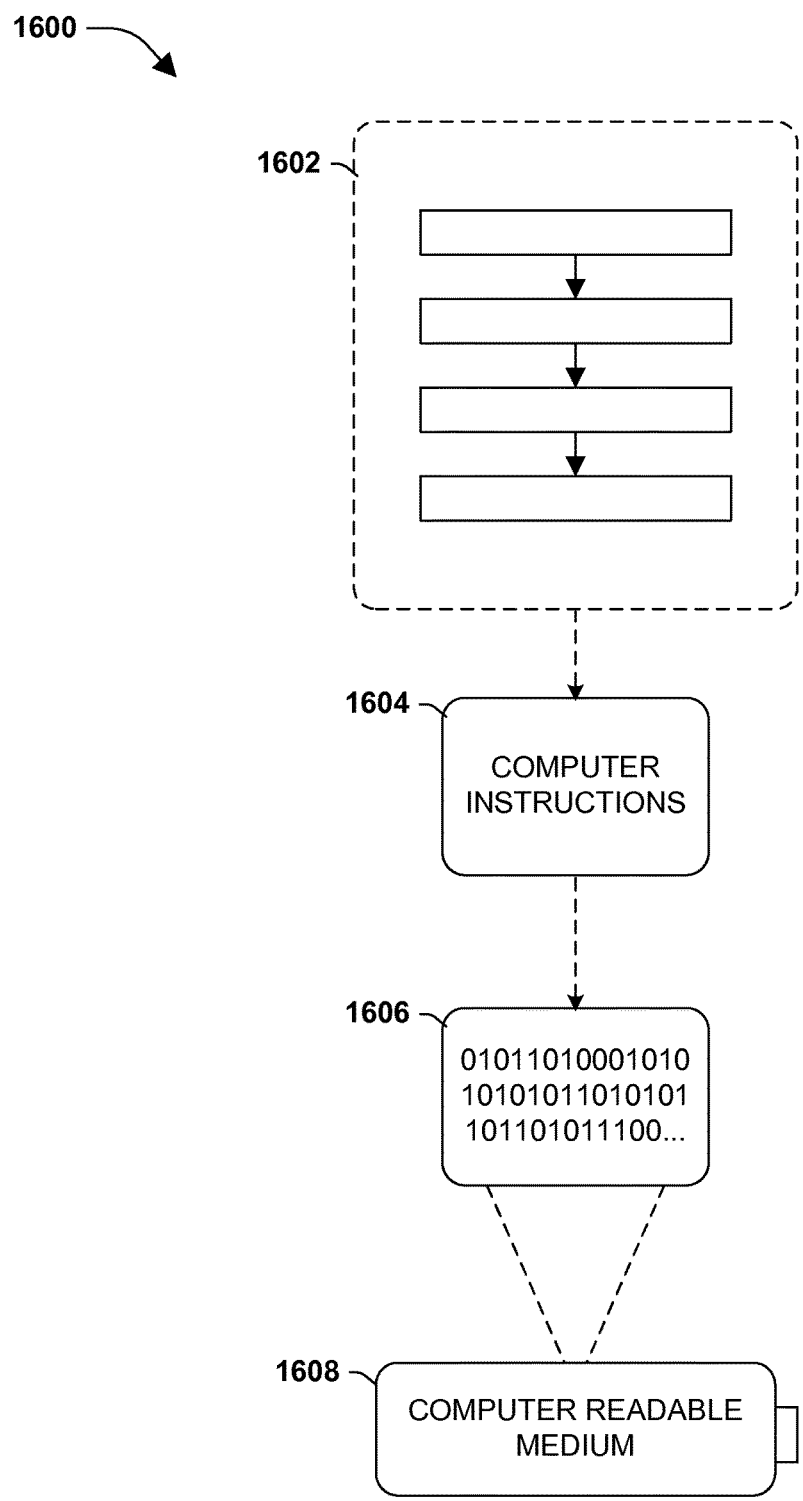
FIG. 16 is an illustration of an example computer-readable medium or computer-readable device including processor-executable instructions configured to embody one or more of the provisions set forth herein, according to one or more embodiments.

Still another embodiment involves a computer-readable medium including processor-executable instructions configured to implement one or more embodiments of the techniques presented herein. An embodiment of a computer-readable medium or a computer-readable device that is devised in these ways is illustrated in FIG. 16, wherein an implementation 1600 includes a computer-readable medium 1608, such as a CD-R, DVD-R, flash drive, a platter of a hard disk drive, etc., on which is encoded computer-readable data 1606. This computer-readable data 1606, such as binary data including a plurality of zero's and one's as shown in 1606, in turn includes a set of computer instructions 1604 configured to operate according to one or more of the principles set forth herein. In one such embodiment 1600, the processor-executable computer instructions 1604 are configured to implement a system, such as the system 100 of FIG. 1, the system 300 of FIG. 3, the system 500 of FIG. 5, etc. In another embodiment, the processor-executable instructions 1604 are configured to perform a method 1602, such as the method 200 of FIG. 2, the method 400 of FIG. 4, the method 800 of FIG. 8, etc. Many such computer-readable media are devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component can be, but is not limited to being, a process running on a processor, a processor, an object, an executable, a thread of execution, a program, or a computer. By way of illustration, both an application running on a controller and the controller can be a component. One or more components residing within a process or thread of execution and a component can be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications can be made to this configuration without departing from the scope or spirit of the claimed subject matter.

FIG. 17 and the following discussion provide a description of a suitable computing environment to implement embodiments of one or more of the provisions set forth herein. The operating environment of FIG. 17 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions are implemented as program modules, such as functions, objects, Application Programming Interfaces (APIs), data structures, and the like, that perform particular tasks or implement particular abstract data types. Typically, the functionality of the computer readable instructions are combined or distributed as desired in various environments.

FIG. 17 illustrates a system 1700 including a computing device 1712 configured to implement one or more embodiments provided herein. In one configuration, computing device 1712 includes at least one processing unit 1716 and memory 1718. Depending on the exact configuration and type of computing device, memory 1718 can be volatile, such as RAM, non-volatile, such as ROM, flash memory, etc., or a combination of the two. This configuration is illustrated in FIG. 17 by dashed line 1714.

In other embodiments, device 1712 includes additional features or functionality. For example, device 1712 also includes additional storage such as removable storage or non-removable storage, including, but not limited to, magnetic storage, optical storage, and the like. Such additional storage is illustrated in FIG. 17 by storage 1720. In one or more embodiments, computer readable instructions to implement one or more embodiments provided herein are in storage 1720. Storage 1720 also stores other computer readable instructions to implement an operating system, an application program, and the like. Computer readable instructions are loaded in memory 1718 for execution by processing unit 1716, for example.

The term "computer readable media" as used herein includes computer storage media. Computer storage media includes volatile and nonvolatile, removable and non-removable media implemented in any method or technology for storage of information such as computer readable instructions or other data. Memory 1718 and storage 1720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1712. Any such computer storage media is part of device 1712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 1712 includes input device(s) 1724 such as keyboard, mouse, pen, voice input device, touch input device, infrared cameras, video input devices, or any other input device. Output device(s) 1722 such as one or more displays, speakers, printers, or any other output device are also included in device 1712. Input device(s) 1724 and output device(s) 1722 are connected to device 1712 via a wired connection, wireless connection, or any combination thereof. In one or more embodiments, an input device or an output device from another computing device are used as input device(s) 1724 or output device(s) 1722 for computing device 1712. Device 1712 also includes communication connection(s) 1726 to facilitate communications with one or more other devices.

According to one or more aspects, a method for customizing vehicle snapshot data is provided, including receiving a snapshot package. The snapshot package can be based on one or more symptoms associated with a vehicle. The snapshot package can include a trigger, a snapshot window, and a set of one or more parameters associated with one or more corresponding component of the vehicle. The method can include taking a snapshot within the snapshot window based on an occurrence of the trigger. Taking the snapshot can include recording the set of one or more parameters from one or more of the corresponding components.

The snapshot package can be configured off board of the vehicle. Additionally, the snapshot package can be configured to capture one or more of the parameters from one or more controller area networks (CANs). The snapshot package can be received based on a telematics channel. In one or more embodiments, the trigger can be manual or automatic. For example, the trigger can be based on one or more user inputs. Additionally, the trigger can be based on one or more conditions associated with one or more of the corresponding components. The method can include transmitting the snapshot to a third party. For example, the snapshot can be transmitted based on a telematics channel. Additionally, the method can include notifying a third party that the snapshot is available. The method can include suggesting a solution for one or more of the symptoms based on an analysis of the snapshot.

According to one or more aspects, a method for customizing vehicle snapshot data is provided, including generating a snapshot package based on one or more symptoms associated with a vehicle. The method can include receiving a snapshot including a set of one or more parameters associated with one or more corresponding components of the vehicle. The method can include receiving a request based on one or more of the symptoms associated with the vehicle. In one or more embodiments, generating the snapshot package includes determining a trigger, determining a snapshot window, and determining one or more parameters to record from one or more corresponding components of the vehicle. The method can include transmitting the snapshot package to the vehicle. In one or more embodiments, the method can include analyzing the snapshot to determine a trend or analyzing the snapshot and one or more additional snapshots to determine a trend.

According to one or more aspects, a system for customizing vehicle snapshot data is provided, including a storage component configured to receive a snapshot package. The snapshot package can be based on one or more symptoms associated with a vehicle. The system can include a snapshot component configured to take a snapshot within the snapshot window based on an occurrence of the trigger. The snapshot component can be configured to take the snapshot by recording a set of one or more parameters from one or more corresponding components of the vehicle. The system can include a telematics component configured to transmit the snapshot to a third party or notify a third party that the snapshot is available. The system can include an analysis component configured to determine a trench based on the snapshot.

According to one or more aspects, a method for customizing diagnostic assistance is provided, including receiving a trigger and taking a snapshot based on an occurrence of the trigger and a configuration of a vehicle. Taking the snapshot can include recording a set of one or more parameters from one or more corresponding components of the vehicle. The method can include receiving the configuration of the vehicle. In one or more embodiments, the trigger includes a diagnostic trouble code (DTC). According to one or more aspects, one or more of the corresponding components sends the DTC. According to one or more aspects, one or more of the corresponding components does not send the DTC. The method can include generating custom diagnostic assistance based on the snapshot.

According to one or more aspects, a system for customizing diagnostic assistance is provided, including one or more controller area networks (CANs) configured to receive an occurrence of a trigger. The system can include a snapshot component configured to take a snapshot based on the occurrence of the trigger and a configuration of a vehicle. The snapshot component can be configured to record a set of one or more parameters from one or more corresponding components of the vehicle.

The system can include an interface component configured to transmit the snapshot to a third party, an analysis component configured to generate a custom diagnostic assistance guide based on the snapshot, an analysis component configured to generate an event report including a summary of one or more of the parameters, or a storage component configured to receive a snapshot package. The snapshot package can be based on the configuration of the vehicle and a diagnostic trouble code (DTC). Additionally, the snapshot component can be configured to take the snapshot based on the snapshot package.

According to one or more aspects, a method for customizing diagnostic assistance is provided, including receiving a snapshot including a set of one or more parameters from one or more corresponding components of a vehicle, identifying one or more areas associated with one or more of the corresponding components or one or more additional components of the vehicle, receiving a set of diagnostic assistance suggestions associated with one or more of the areas, classifying one or more of the areas as suspect, non-suspect, or unknown based on the snapshot, and providing a subset of the diagnostic assistance suggestions based on classification of one or more of the areas.

In one or more embodiments, one or more of the parameters of the snapshot can be selected based on a configuration of the vehicle. The snapshot can include a snapshot window, a trigger, and a set of one or more parameters associated with one or more corresponding components. Additionally, the method can include determining the subset of the diagnostic assistance suggestions by removing one or more diagnostic assistance suggestions classified as non-suspect. One or more of the areas are associated with one or more of the corresponding components, one or more of the additional components, one or more systems, one or more units, one or more connections, or one or more controller area networks (CANs) of the vehicle. The set of diagnostic assistance suggestions can be received from a diagnostic assistance library. A diagnostic assistance suggestion of the subset of the diagnostic assistance suggestions can include an instruction to inspect one or more areas classified as suspect. Additionally, an event report having a summary of one or more of the parameters can be generated.

According to one or more aspects, a method for providing driving analytics is provided, including taking a snapshot and receiving one or more driving analytics suggestions for a driver of the vehicle based on the snapshot. The snapshot can include a set of one or more parameters from one or more corresponding components of a vehicle. The method can include presenting one or more of the driving analytics suggestions to the driver. The presenting can be based on an audio prompt or a display. The method can include receiving a request from the driver of the vehicle for driving analytics. The request can be based on a voice command or a selection. The method can include prompting the driver of the vehicle to enroll in a driving analytics program. One or more of the parameters of the snapshot can be indicative of a driving pattern of one or more drivers of the vehicle or be associated with tire wear of the vehicle. The method can include transmitting the snapshot to a third party. Additionally, the method can include presenting one or more of the driving analytics suggestions to the driver based on an action of the driver of the vehicle.

According to one or more aspects, a system for providing driving analytics is provided, including a snapshot component configured to take a snapshot and a suggestion component configured to suggest one or more driving analytics suggestions for a driver of the vehicle based on the snapshot. The snapshot can include a set of one or more parameters from one or more corresponding components of a vehicle. The system can include an interface component configured to transmit the snapshot to a third party or an input component configured to receive a request from the driver of the vehicle for driving analytics. The interface component can be configured to receive one or more of the driving analytics suggestions from the third party. One or more of the parameters of the snapshot can be indicative of a driving pattern. One or more of the driving analytics suggestions can be based on an audio prompt or a display.

According to one or more aspects, a system for providing driving analytics is provided, including a server component configured to receive a snapshot and an analysis component configured to generate one or more driving analytics suggestions for a driver of the vehicle based on the snapshot. The snapshot can include a set of one or more parameters from one or more corresponding components of a vehicle. One or more of the parameters of the snapshot can indicative of a driving pattern. Additionally, the server component can be configured to transmit one or more of the driving analytics suggestions to the vehicle. The server component can have a connection to the vehicle via a telematics channel.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations are necessarily present in each embodiment provided herein.

As used in this application, "or" is intended to mean an inclusive "or" rather than an exclusive "or". In addition, "a" and "an" as used in this application are generally construed to mean "one or more" unless specified otherwise or clear from context to be directed to a singular form. Also, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel.

Also, although the disclosure has been shown and described with respect to one or more implementations, equivalent alterations and modifications will occur based on a reading and understanding of this specification and the annexed drawings. The disclosure includes all such modifications and alterations and is limited only by the scope of the following claims.

What is claimed is:

1. A method for providing driving analytics, comprising:
   taking, by a control unit of a vehicle, a snapshot, the snapshot comprising a set of one or more parameters from one or more corresponding components of the vehicle, via a controller area network of the vehicle in response to a trigger according to a snapshot package defining a snapshot window including a time period before the trigger; and
   receiving one or more driving analytics suggestions for a driver of the vehicle based on the snapshot, wherein one or more of the parameters of the snapshot is indicative of a driving Pattern of the driver, and
   wherein the receiving is implemented via a processing unit.

2. The method of claim 1, comprising presenting one or more of the driving analytics suggestions to the driver.

3. The method of claim 2, wherein the presenting is based on an audio prompt or a display.

4. The method of claim 1, comprising receiving a request from the driver of the vehicle for driving analytics.

5. The method of claim 4, wherein the request is based on a voice command or a selection.

6. The method of claim 1, comprising prompting the driver of the vehicle to enroll in a driving analytics program.

7. The method of claim 1, comprising transmitting the snapshot to a third party.

8. The method of claim 1, wherein one or more of the parameters is associated with tire wear of the vehicle.

9. The method of claim 1, comprising presenting one or more of the driving analytics suggestions to the driver based on a predicted driving action of the driver of the vehicle, the driving analytics suggestions providing suggestions to improve the predicted driving action of the driver.

10. A system for providing driving analytics, comprising:
    a snapshot component configured to take a snapshot, the snapshot comprising a set of one or more parameters from one or more corresponding components of the vehicle, via a controller area network of the vehicle in response to a trigger according to a snapshot package defining a snapshot window including a time period before the trigger;
    a suggestion component configured to suggest one or more driving analytics suggestions for a driver of the vehicle based on the snapshot; and
    a telematics component configured to transmit the snapshot to a third party,
    wherein the snapshot component or the suggestion component are implemented via a control unit of the vehicle.

11. The system of claim 10, wherein the telematics component is configured to receive one or more of the driving analytics suggestions from the third party.

12. The system of claim 10, wherein one or more of the driving analytics suggestions is based on an audio prompt or a display.

13. The system of claim 10, wherein one or more of the parameters of the snapshot is indicative of a driving pattern of the driver.

14. The system of claim 10, comprising an input component configured to receive a request from the driver of the vehicle for driving analytics.

15. A system for providing driving analytics, comprising:
    a server component configured to receive a snapshot, the snapshot comprising a set of one or more parameters from one or more corresponding components of a vehicle according to a snapshot package defining a snapshot window including a time period before a trigger that initiates the snapshot; and
    an analysis component configured to generate one or more driving analytics suggestions for a driver of the vehicle based on the snapshot,
    wherein the server component or the analysis component are implemented via a processing unit.

16. The system of claim 15, wherein one or more of the parameters of the snapshot is indicative of a driving pattern of the driver.

17. The system of claim 15, wherein the server component is configured to transmit one or more of the driving analytics suggestions to the vehicle.

18. The system of claim 15, wherein the server component has a connection to the vehicle via a telematics channel.

* * * * *